US011283827B2

(12) United States Patent
Segal et al.

(10) Patent No.: US 11,283,827 B2
(45) Date of Patent: Mar. 22, 2022

(54) LATERAL MOVEMENT STRATEGY DURING PENETRATION TESTING OF A NETWORKED SYSTEM

(71) Applicant: XM Cyber Ltd., Herzelyia (IL)

(72) Inventors: Ronen Segal, Hertzliya (IL); Yaron Shani, Holon (IL)

(73) Assignee: XM CYBER LTD., Herzliya (IL)

( * ) Notice: Subject to any disclaimer, the term of this patent is extended or adjusted under 35 U.S.C. 154(b) by 321 days.

(21) Appl. No.: 16/716,334

(22) Filed: Dec. 16, 2019

(65) Prior Publication Data

US 2020/0280577 A1 Sep. 3, 2020

Related U.S. Application Data

(60) Provisional application No. 62/811,554, filed on Feb. 28, 2019.

(51) Int. Cl.
*H04L 29/00* (2006.01)
*H04L 29/06* (2006.01)

(52) U.S. Cl.
CPC .......... *H04L 63/1433* (2013.01); *H04L 63/20* (2013.01)

(58) Field of Classification Search
CPC ... H04L 63/20; H04L 63/1433; H04L 63/104; H04L 63/1416; H04L 63/1425; H04L 63/10; H04L 63/083; H04L 9/0891
See application file for complete search history.

(56) References Cited

U.S. PATENT DOCUMENTS 6,574,737 B1 6/2003 Kingsford et al.
6,711,127 B1 3/2004 Gorman et al.
(Continued)

FOREIGN PATENT DOCUMENTS

CN 103200230 A 7/2013
CN 103916384 A 7/2014
(Continued)

OTHER PUBLICATIONS

CN103200230 Machine Translation (by EPO and Google)—published Jul. 10, 2013; Li Qianmu.
(Continued)

*Primary Examiner* — Don G Zhao
(74) *Attorney, Agent, or Firm* — Momentum IP; Marc Van Dyke

(57) ABSTRACT

A method for executing a penetration testing campaign comprises performing a determination of conditional compromisability for one or more network nodes, including examining each given network node of the one or more network nodes to determine whether it can be compromised from a network node that is already determined to be compromisable and that can communicate with the given network node to the extent required for exploiting a vulnerability applicable to the given network node. Subsequently, for a selected target network node determined to be conditionally compromisable, a potential attacking node is selected from the already-determined-to-be-compromisable nodes and a check is made whether the selected potential attacking network node can communicate with the selected target network node to the extent required, thus leading to a determination that the selected target network node is not only conditionally compromisable but also actually compromisable by an attacker.

20 Claims, 18 Drawing Sheets

(56) References Cited

U.S. PATENT DOCUMENTS

| | | | |
|---|---|---|---|
| 6,918,038 | B1 | 7/2005 | Smith et al. |
| 6,952,779 | B1 * | 10/2005 | Cohen .................. G06F 21/577 726/22 |
| 7,013,395 | B1 * | 3/2006 | Swiler ................. H04L 63/1433 713/151 |
| 7,296,092 | B2 | 11/2007 | Nguyen |
| 7,693,810 | B2 | 4/2010 | Donoho et al. |
| 7,757,293 | B2 | 7/2010 | Caceres et al. |
| 7,774,361 | B1 * | 8/2010 | Nachenberg .......... G06F 21/552 707/779 |
| 7,926,113 | B1 | 4/2011 | Gula et al. |
| 7,934,254 | B2 | 4/2011 | Graham |
| 7,966,659 | B1 | 6/2011 | Wilkinson et al. |
| 8,001,589 | B2 | 8/2011 | Ormazabal et al. |
| 8,112,016 | B2 | 2/2012 | Matsumoto et al. |
| 8,127,359 | B2 | 2/2012 | Kelekar |
| 8,201,257 | B1 | 6/2012 | Andres et al. |
| 8,321,944 | B1 | 11/2012 | Mayer et al. |
| 8,356,353 | B2 | 1/2013 | Futoransky et al. |
| 8,365,289 | B2 | 1/2013 | Russ et al. |
| 8,392,997 | B2 | 3/2013 | Chen et al. |
| 8,490,193 | B2 | 7/2013 | Sarraute Yamada et al. |
| 8,490,196 | B2 | 7/2013 | Lucangeli Obes et al. |
| 8,528,078 | B2 * | 9/2013 | Camaisa ............. H04L 63/1483 726/22 |
| 8,650,651 | B2 | 2/2014 | Podjarny et al. |
| 8,752,183 | B1 | 6/2014 | Heiderich et al. |
| 8,813,235 | B2 | 8/2014 | Sidagni |
| 8,844,041 | B1 | 9/2014 | Kienzle et al. |
| 9,015,301 | B2 | 4/2015 | Redlich et al. |
| 9,015,847 | B1 | 4/2015 | Kaplan et al. |
| 9,076,013 | B1 | 7/2015 | Bailey, Jr. et al. |
| 9,100,430 | B1 | 8/2015 | Seiver et al. |
| 9,183,397 | B2 | 11/2015 | Futoransky et al. |
| 9,185,136 | B2 * | 11/2015 | Dulkin ................ H04L 63/0807 |
| 9,215,245 | B1 | 12/2015 | Rajab et al. |
| 9,224,117 | B2 | 12/2015 | Chapman |
| 9,270,696 | B2 | 2/2016 | Fritzson et al. |
| 9,276,952 | B2 | 3/2016 | Simpson et al. |
| 9,292,695 | B1 | 3/2016 | Bassett |
| 9,350,753 | B2 | 5/2016 | Kaplan et al. |
| 9,412,073 | B2 | 8/2016 | Brandt et al. |
| 9,467,467 | B2 | 10/2016 | Alamuri |
| 9,473,522 | B1 | 10/2016 | Kotler et al. |
| 9,558,355 | B2 | 1/2017 | Madou et al. |
| 9,760,716 | B1 | 9/2017 | Mulchandani |
| 9,781,149 | B1 | 10/2017 | Himler et al. |
| 9,781,160 | B1 | 10/2017 | Irimie et al. |
| 9,800,603 | B1 | 10/2017 | Sidagni |
| 9,824,222 | B1 | 11/2017 | Kaplan et al. |
| 9,870,715 | B2 | 1/2018 | Sadeh-Koniecpol et al. |
| 9,894,090 | B2 | 2/2018 | Hebert et al. |
| 9,912,687 | B1 | 3/2018 | Wescoe et al. |
| 10,038,711 | B1 | 7/2018 | Gorodissky et al. |
| 10,068,095 | B1 | 9/2018 | Segal et al. |
| 10,108,803 | B2 | 10/2018 | Chari et al. |
| 10,122,750 | B2 | 11/2018 | Gorodissky et al. |
| 10,182,040 | B2 | 1/2019 | Hu et al. |
| 10,257,220 | B2 | 4/2019 | Gorodissky et al. |
| 10,291,643 | B2 | 5/2019 | Marquez et al. |
| 10,367,846 | B2 | 7/2019 | Gorodissky et al. |
| 10,382,473 | B1 | 8/2019 | Ashkenazy et al. |
| 10,412,112 | B2 | 9/2019 | Ashkenazy et al. |
| 10,440,044 | B1 | 10/2019 | Zini et al. |
| 10,447,721 | B2 | 10/2019 | Lasser |
| 10,454,966 | B2 | 10/2019 | Gorodissky et al. |
| 10,462,177 | B1 | 10/2019 | Lasser et al. |
| 10,469,521 | B1 | 11/2019 | Segal et al. |
| 10,498,803 | B1 | 12/2019 | Zini et al. |
| 10,503,911 | B2 | 12/2019 | Chari et al. |
| 10,505,969 | B2 | 12/2019 | Gorodissky et al. |
| 10,534,917 | B2 | 1/2020 | Segal |
| 10,574,684 | B2 | 2/2020 | Segal et al. |
| 10,574,687 | B1 | 2/2020 | Lasser |
| 10,581,895 | B2 | 3/2020 | Ashkenazy et al. |
| 10,637,882 | B2 | 4/2020 | Gorodissky et al. |
| 10,637,883 | B1 | 4/2020 | Segal et al. |
| 10,645,113 | B2 | 5/2020 | Gorodissky et al. |
| 10,652,269 | B1 | 5/2020 | Segal et al. |
| 10,686,822 | B2 | 6/2020 | Segal |
| 10,686,823 | B2 | 6/2020 | Gorodissky et al. |
| 2002/0040439 | A1 * | 4/2002 | Kellum ................ G06F 21/567 726/26 |
| 2003/0140223 | A1 | 7/2003 | Desideri |
| 2003/0195861 | A1 | 10/2003 | McClure et al. |
| 2003/0208616 | A1 | 11/2003 | Laing et al. |
| 2003/0212779 | A1 | 11/2003 | Boyter et al. |
| 2003/0217039 | A1 | 11/2003 | Kurtz et al. |
| 2004/0015728 | A1 | 1/2004 | Cole et al. |
| 2004/0078384 | A1 | 4/2004 | Keir et al. |
| 2004/0095907 | A1 | 5/2004 | Agee et al. |
| 2005/0086502 | A1 | 4/2005 | Rayes et al. |
| 2005/0100157 | A1 | 5/2005 | Gray et al. |
| 2005/0102534 | A1 | 5/2005 | Wong |
| 2006/0015943 | A1 | 1/2006 | Mahieu |
| 2007/0011319 | A1 | 1/2007 | McClure et al. |
| 2007/0204347 | A1 | 8/2007 | Caceres et al. |
| 2007/0271360 | A1 | 11/2007 | Sahita et al. |
| 2008/0092237 | A1 | 4/2008 | Yoon et al. |
| 2008/0104702 | A1 | 5/2008 | Choi et al. |
| 2008/0172716 | A1 | 7/2008 | Talpade et al. |
| 2008/0209567 | A1 | 8/2008 | Lockhart et al. |
| 2008/0244748 | A1 | 10/2008 | Neystadt et al. |
| 2008/0256638 | A1 | 10/2008 | Russ et al. |
| 2008/0288822 | A1 | 11/2008 | Wu et al. |
| 2009/0044277 | A1 | 2/2009 | Aaron |
| 2009/0049553 | A1 | 2/2009 | Vasudeva |
| 2009/0172813 | A1 | 7/2009 | Aaron |
| 2009/0199294 | A1 * | 8/2009 | Schneider ............ G06F 21/577 726/18 |
| 2010/0138925 | A1 | 6/2010 | Barai et al. |
| 2011/0016513 | A1 | 1/2011 | Bailey, Jr. |
| 2011/0035803 | A1 * | 2/2011 | Lucangeli Obes ......................... H04L 63/1433 726/25 |
| 2011/0061104 | A1 | 3/2011 | Sarraute Yamada et al. |
| 2011/0078507 | A1 | 3/2011 | Choi et al. |
| 2011/0107421 | A1 * | 5/2011 | Mahone .................. H04L 43/00 726/22 |
| 2011/0167493 | A1 * | 7/2011 | Song ................... H04L 63/1466 726/23 |
| 2012/0174228 | A1 | 7/2012 | Giakouminakis et al. |
| 2012/0255022 | A1 | 10/2012 | Ocepek et al. |
| 2013/0014263 | A1 | 1/2013 | Porcello et al. |
| 2013/0031635 | A1 * | 1/2013 | Lotem .................. G06F 21/577 726/25 |
| 2013/0036459 | A1 * | 2/2013 | Liberman ............. H04L 63/102 726/6 |
| 2013/0198840 | A1 * | 8/2013 | Drissi .................... H04L 9/0891 726/22 |
| 2013/0254857 | A1 * | 9/2013 | Bajenov ................ H04L 63/083 726/7 |
| 2013/0297375 | A1 | 11/2013 | Chapman |
| 2013/0312092 | A1 * | 11/2013 | Parker .................. H04L 63/1408 726/22 |
| 2013/0347129 | A1 * | 12/2013 | Samuelsson ........ H04L 63/0838 726/28 |
| 2014/0007241 | A1 | 1/2014 | Gula et al. |
| 2014/0013434 | A1 * | 1/2014 | Ranum ............... H04L 63/1416 726/24 |
| 2014/0101761 | A1 * | 4/2014 | Harlacher ............. G06F 3/0619 726/23 |
| 2014/0137257 | A1 | 5/2014 | Martinez et al. |
| 2014/0165204 | A1 | 6/2014 | Williams et al. |
| 2014/0173739 | A1 | 6/2014 | Ahuja et al. |
| 2014/0215612 | A1 * | 7/2014 | Niccolini ............ H04L 63/1425 726/22 |
| 2014/0237606 | A1 | 8/2014 | Futoransky et al. |
| 2014/0282871 | A1 * | 9/2014 | Rowland .................. G06F 21/60 726/3 |
| 2014/0325645 | A1 * | 10/2014 | Turgeman ............. G06F 21/316 726/22 |
| 2014/0328423 | A1 | 11/2014 | Agee et al. |

(56) References Cited

U.S. PATENT DOCUMENTS

| | | |
|---|---|---|
| 2015/0058993 A1 | 2/2015 | Choi et al. |
| 2015/0180894 A1* | 6/2015 | Sadovsky ............... H04L 67/22 726/22 |
| 2015/0229671 A1* | 8/2015 | Boss ................... H04L 63/1458 726/26 |
| 2015/0237063 A1 | 8/2015 | Cotton et al. |
| 2016/0044057 A1 | 2/2016 | Chenette et al. |
| 2016/0134653 A1 | 5/2016 | Vallone et al. |
| 2016/0147635 A1 | 5/2016 | Schwarzmann |
| 2016/0234251 A1 | 8/2016 | Boice et al. |
| 2016/0234661 A1 | 8/2016 | Narasimhan et al. |
| 2016/0248800 A1 | 8/2016 | Ng et al. |
| 2016/0275289 A1 | 9/2016 | Sethumadhavan et al. |
| 2016/0342796 A1 | 11/2016 | Kaplan et al. |
| 2016/0352771 A1* | 12/2016 | Sivan ................... H04L 63/1433 |
| 2017/0006055 A1 | 1/2017 | Strom et al. |
| 2017/0013008 A1 | 1/2017 | Carey et al. |
| 2017/0046519 A1 | 2/2017 | Cam |
| 2017/0063886 A1 | 3/2017 | Muddu et al. |
| 2017/0098086 A1 | 4/2017 | Hoernecke et al. |
| 2017/0104780 A1 | 4/2017 | Zaffarano et al. |
| 2017/0116421 A1 | 4/2017 | M C et al. |
| 2017/0123925 A1 | 5/2017 | Patnaik et al. |
| 2017/0149816 A1 | 5/2017 | Kelekar |
| 2017/0214701 A1 | 7/2017 | Hasan |
| 2017/0223043 A1 | 8/2017 | Munoz et al. |
| 2017/0279843 A1 | 9/2017 | Schultz et al. |
| 2017/0286690 A1 | 10/2017 | Chari et al. |
| 2017/0373923 A1 | 12/2017 | Kazachkov et al. |
| 2018/0018465 A1 | 1/2018 | Carey et al. |
| 2018/0054429 A1 | 2/2018 | Donahue |
| 2018/0103052 A1 | 4/2018 | Choudhury et al. |
| 2018/0219900 A1 | 8/2018 | Gorodissky et al. |
| 2018/0219901 A1 | 8/2018 | Gorodissky et al. |
| 2018/0219903 A1 | 8/2018 | Segal |
| 2018/0219904 A1 | 8/2018 | Gorodissky et al. |
| 2018/0219905 A1 | 8/2018 | Gorodissky et al. |
| 2018/0219909 A1 | 8/2018 | Gorodissky et al. |
| 2018/0270268 A1 | 9/2018 | Gorodissky et al. |
| 2018/0330103 A1 | 11/2018 | Chari et al. |
| 2018/0365429 A1 | 12/2018 | Segal |
| 2019/0007428 A1 | 1/2019 | Moen et al. |
| 2019/0014141 A1 | 1/2019 | Segal et al. |
| 2019/0036961 A1 | 1/2019 | Gorodissky et al. |
| 2019/0068631 A1* | 2/2019 | Ashkenazy ......... H04L 63/1433 |
| 2019/0081974 A1 | 3/2019 | Lasser |
| 2019/0149572 A1 | 5/2019 | Gorodissky et al. |
| 2019/0182270 A1 | 6/2019 | Kim |
| 2019/0182286 A1 | 6/2019 | Zini |
| 2019/0245883 A1 | 8/2019 | Gorodissky et al. |
| 2019/0268369 A1 | 8/2019 | Gorodissky et al. |
| 2019/0312903 A1 | 10/2019 | Zini et al. |
| 2019/0364070 A1 | 11/2019 | Zini et al. |
| 2019/0387015 A1 | 12/2019 | Ashkenazy et al. |
| 2020/0106800 A1 | 4/2020 | Gorodissky et al. |
| 2020/0145449 A1 | 5/2020 | Segal et al. |
| 2020/0153852 A1 | 5/2020 | Segal et al. |
| 2020/0236130 A1 | 7/2020 | Gorodissky et al. |
| 2020/0280577 A1 | 9/2020 | Segal et al. |

FOREIGN PATENT DOCUMENTS

| | | |
|---|---|---|
| CN | 104009881 A | 8/2014 |
| EP | 1559008 A1 | 8/2005 |
| EP | 3079336 A1 | 10/2016 |
| WO | 0038036 A2 | 6/2000 |
| WO | 2008054982 A2 | 5/2008 |
| WO | 2010069587 A1 | 6/2010 |
| WO | 2013087982 A1 | 6/2013 |
| WO | 2015111039 A1 | 7/2015 |
| WO | 2016081561 A1 | 5/2016 |
| WO | 2016164844 A1 | 10/2016 |
| WO | 2018138608 A2 | 8/2018 |
| WO | 2018156394 A1 | 8/2018 |

OTHER PUBLICATIONS

CN103916384 Machine Translation (by EPO and Google)—published Jul. 9, 2014 Zhong Li.

CN104009881 Machine Translation (by EPO and Google)—published Aug. 27, 2014 Wang Tian.

Authors: Alhomidi and Reed Title: Attack Graph-Based Risk Assessment and Optimisation Approach International Journal of Network Security & Its Applications (IJNSA), vol. 6, No. 3, May 2014.

* cited by examiner

DETERMINATION OF CONDITIONAL COMPROMISABILITY – 2

Perform S01 a determination of conditional compromisability for a network-node-set comprising one or more network nodes of the plurality of network nodes, the performing of the determination of conditional compromisability for the network-node-set including:
    i. for each given network node of the network-node-set, performing a determination of conditional compromisability for the given network node by examining the given network node so as to determine whether the given network node can be compromised by the attacker (A) using a corresponding vulnerability applicable to the given network node, and (B) from a network node of the plurality of network nodes that (1) is already determined to be compromisable by the attacker prior to the performing of the determination of conditional compromisability for the network-node-set and (2) can communicate with the given network node to the extent required for exploiting the corresponding vulnerability in the given network node, and
    ii. identifying a group of potential target nodes consisting of every network node of the network-node-set that is determined to be conditionally compromisable;

↓

Select S02 a target network node from the group of potential target nodes, subsequent to the performing of the determination of conditional compromisability for the network-node-set

↓

Select S04 a potential attacking network node from the plurality of network nodes of the networked system which are already determined to be compromisable by the attacker prior to the performing of the determination of conditional compromisability for the network-node-set

↓

Check S05 whether the selected potential attacking network node can communicate with the selected target network node to the extent required for exploiting the vulnerability corresponding to the selected target network node

↓

Determine S06 that the selected target network node is compromisable by the attacker, in response to determining that the selected potential attacking network node can communicate with the selected target network node to the extent required

CONTINUES IN FIG. 11B

OPTIONAL STEP

Force S03 one or more user-defined network nodes of the plurality of network nodes of the networked system to become already-compromisable

FIG. 11A

CONTINUES FROM FIG. 11A

Determine S07 the way for the attacker to compromise the networked system, wherein the way for the attacker to compromise the networked system includes a step of compromising the selected target network node using the vulnerability corresponding to the selected target network node Report S08 the determined way for an attacker to compromise the networked system, the reporting comprising at least one action selected from the actions group consisting of (i) causing a display device to display a report including information about the determined way to compromise the networked system, (ii) recording the report including the information about the determined way to compromise the networked system in a file, and (iii) electronically transmitting the report including the information about the determined way to compromise the networked system

FIG. 11B

LATERAL MOVEMENT STRATEGY DURING PENETRATION TESTING OF A NETWORKED SYSTEM

CROSS-REFERENCE TO RELATED APPLICATIONS

This patent application claims the benefit of U.S. Provisional Patent Application No. 62/811,554 filed on Feb. 28, 2019, which is incorporated herein by reference in its entirety.

FIELD OF THE INVENTION

The present invention relates to systems and methods for penetration testing of networked systems, and to lateral movement strategies for simulating an attacker's movement within networked systems. In particular, the present invention is suitable for penetration testing of networked systems in which network nodes are susceptible to attackers taking advantage of node-to-node communications to attack targeted network nodes from already-compromised network nodes.

BACKGROUND

There is currently a proliferation of organizational networked computing systems. Every type of organization, be it a commercial company, a university, a bank, a government agency or a hospital, heavily relies on one or more networks interconnecting multiple computing nodes. Failures of the networked computing system of an organization or even of only a portion of it might cause a significant damage, up to completely shutting down all operations. Additionally, all data of the organization exists somewhere on its networked computing system, including all confidential data comprising its "crown jewels" such as prices, details of customers, purchase orders, employees' salaries, technical formulas, etc. Loss of such data or leaks of such data to outside unauthorized entities might be disastrous for the organization.

As almost all organizational networks are connected to the Internet at least through one computing node, they are subject to attacks by computer hackers or by hostile adversaries. Quite often the newspapers are reporting incidents in which websites crashed, sensitive data was stolen or service to customers was denied, where the failures were the results of hostile penetration into an organizations networked computing system.

As a result, many organizations invest a lot of efforts and costs in preventive means designed to protect their computing networks against potential threats. There are many defensive products offered in the market claiming to provide protection against one or more known modes of attack, and many organizations arm themselves to the teeth with multiple products of this kind.

However, it is difficult to tell how effective such products really are in achieving their stated goals of blocking hostile attacks, and consequently most CISO's (Computer Information Security Officers) will admit (maybe only off the record), that they don't really know how well they can withstand an attack from a given adversary. The only way to really know how strong and secure a system is, is by trying to attack it as a real adversary would. This is known as red-teaming or penetration testing (pen testing, in short), and is a very common approach that is even required by regulation in some developed countries.

Penetration testing requires highly talented people to man the red team. Those people should be familiar with each and every publicly known vulnerability and attacking method and should also have a very good familiarity with networking techniques and multiple operating systems implementations. Such people are hard to find and therefore many organizations give up establishing their own red teams and resort to hiring external expert consultants for carrying out that role (or completely give up penetration testing). But external consultants are expensive and therefore are typically called in only for brief periods separated by long intervals in which no such testing is done. This makes the penetration testing ineffective as vulnerabilities caused by new attacks that appear almost daily are discovered only months after becoming serious threats to the organization.

Additionally, even rich organizations that can afford hiring talented experts as in-house red teams do not achieve good protection. Testing for vulnerabilities of a large network containing many types of computers, operating systems, network routers and other devices is both a very complex and a very tedious process. The process is prone to human errors of missing testing for certain threats or misinterpreting the damages of certain attacks. Also, because a process of full testing against all threats is quite long, the organization might again end with a too long discovery period after a new threat appears.

Because of the above difficulties several vendors are proposing automated penetration testing systems. Such systems automatically discover and report vulnerabilities of a networked system, potential damages that might be caused to the networked system, and potential trajectories of attack that may be employed by an attacker.

The Problem to Solve

A penetration testing system operates by iteratively compromising (physically or simulatively) network nodes of the tested networked system. At any iteration during a penetration testing campaign, some (or possibly zero) of the nodes of the tested networked system are considered to be already compromised by the potential attacker, and the penetration testing system attempts to compromise an additional network node (not yet compromised) by utilizing the already-compromised nodes that are operating under the control of the attacker's instructions. Once an additional node is found to be compromised, it is added to the group of already-compromised nodes and a new iteration begins.

If the penetration testing system is an actual-attack penetration testing system (see definition in the Definitions section), then moving from one iteration to the next one involves actually attempting to compromise a network node. If the penetration testing system is a simulated penetration testing system (see definition in the Definitions section), then the moving from one iteration to the next one involves simulating or otherwise evaluating the results of an attempt by the attacker to compromise a network node, without actually attempting to compromise it. In other words, in a simulated penetration testing system, what is determined is whether a network node is compromisable without risking compromising it.

Note that in this disclosure the terms "compromised node" and "compromisable node" are synonyms, and should both be understood as either "a node that is actually compromised" (when referring to an actual-attack penetration testing system) or "a node that is determined to be compromisable without being compromised" (when referring to a simulated penetration testing system).

The determination of which node is to be the next one to attempt to compromise and to be added to the group of already-compromised nodes often includes three main steps:

A. Determining a network node that is a candidate to be the next node to be compromised B. Determining a potential vulnerability that is applicable to the candidate node and may be used for compromising it C. Verifying that the determined candidate node can indeed be compromised by the determined vulnerability under current conditions The determining of the candidate node (Step A above) is typically done based on the lateral movement strategy (see definition in the Definitions section) of the attacker of the current penetration testing campaign. For example, if the lateral movement strategy in use is "breadth first", then, at each iteration, the penetration testing system determines all the nodes that are directly accessible from an already-compromised node and selects the one whose distance from the first node compromised by the campaign is the smallest. A tie-breaking rule can be used when multiple directly-accessible nodes have the same distance.

The determining of the potential vulnerability that may compromise the determined candidate node (Step B) is typically achieved by using a pre-compiled knowledge base about known vulnerabilities, which depends on characteristics of the candidate node that is currently being considered. For example, the penetration testing system may have in its knowledge base a rule saying that a network node running the Windows 7 Operating System might be compromised by sending it a specific network message through a specific Internet port.

The verifying step (Step C) is typically necessary because knowing that a node might be compromised by a given vulnerability is not the same as knowing for sure that it would be compromised by the given vulnerability under current conditions. For example, the candidate node may have installed on it a patch provided by Microsoft for making the Windows 7 Operating System immune to that vulnerability. Alternatively, the administrator of the candidate node may have disabled the service that is using the specific Internet port and therefore the node is currently not listening to that specific port and is thus currently not vulnerable to anything sent to it through that specific port. Therefore, the verifying step relies on knowledge about what is going on inside the candidate node to find out whether the determined potential vulnerability would indeed compromise the candidate node under current conditions. The verification (or, equivalently, validation) is achieved either by attempting an actual attack on the determined candidate node using the determined vulnerability or by simulating/evaluating the response of the candidate node to such an attack.

An example of a prior art penetration testing system implementing the above three steps is disclosed in U.S. Pat. No. 10,257,220. The '220 solution is a penetration testing system that uses reconnaissance client agents (see definition in the Definitions section) that are installed in multiple nodes of the tested networked system and report, inter alia, current internal data of those multiple nodes. The data reported from a candidate node is used in a remote computing device of the penetration testing system in performing the verifying step for finding out whether current conditions in the candidate node would allow the potential vulnerability to compromise the candidate node. Because the internal data of the candidate node is reported by the reconnaissance agent installed at the candidate node, there is no need to conduct an actual attack on the candidate node for collecting that internal data, and therefore there is no risk the candidate node will be actually compromised by the test.

In the '220 solution, an iteration of the penetration testing process includes:

a. selecting a target network node on which the reconnaissance client agent is installed, the target node being a node of the networked system b. based on the target network node, selecting a potential vulnerability that may compromise the target network node c. receiving, at the remote computing device and from the reconnaissance client agent installed on the target network node, internal data of the target network node d. validating that the target network node could be successfully compromised using the selected potential vulnerability, the validating being based on the internal data received from the target network node Using the Windows 7 example mentioned above, the verifying step of the '220 solution retrieves from a vulnerabilities knowledge base a rule for deciding the success of compromising a node using the above Windows 7 vulnerability. For example, the rule may say that a Windows 7 node is compromisable by that vulnerability if (i) it does not a have a given OS patch installed, and (ii) the Internet port associated with the vulnerability is currently in use. The verifying step of the '220 solution reviews the report most recently received from the client agent installed on the target node and checks whether those two conditions are currently satisfied. Only if both conditions are satisfied will the remote computing device of the '220 solution conclude that the compromising would have been successful.

However, the prior art solutions, including the '220 solution, suffer from a severe drawback. In many networked systems, most of the network nodes are quite difficult to compromise, with only a minority of the nodes being "weak spots" that allow attackers to make progress in their attack by compromising them. When this is the case in the tested networked system, the prior art solutions are not efficient. As the prior art solutions first blindly select the next target node according to the current lateral movement strategy (without knowing whether it is a "weak spot" or a "strong spot"), and only then look for a potential vulnerability that is likely to succeed in compromising the selected target node, most attempts to validate that the selected target node can successfully be compromised by the selected potential vulnerability will fail.

Consequently, in most iterations of the penetration testing campaign, there will be one or more futile attempts to make progress with a "strong spot" target node, before a "weak spot" target node is successfully validated as compromisable.

There is thus a need for a penetration testing solution which does not suffer from the inefficiency drawback described above.

SUMMARY OF THE INVENTION

A method is disclosed, according to embodiments of the present invention, for executing a penetration testing campaign in a networked system by a penetration testing system so as to determine a way for an attacker to compromise the networked system, the networked system comprising a plurality of network nodes. The method comprises (a) performing a determination of conditional compromisability for a network-node-set comprising one or more network nodes of the plurality of network nodes, the performing of the determination of conditional compromisability for the network-node-set including: (i) for each given network node of the network-node-set, performing a determination of conditional compromisability for the given network node by examining the given network node so as to determine whether the given network node can be compromised by the attacker (A) using a corresponding vulnerability applicable to the given network node, and (B) from a network node of the plurality of network nodes that (1) is already determined to be compromisable by the attacker prior to the performing of the determination of conditional compromisability for the network-node-set and (2) can communicate with the given network node to the extent required for exploiting the corresponding vulnerability in the given network node; and (ii) identifying a group of potential target nodes consisting of every network node of the network-node-set that is determined to be conditionally compromisable. The method additionally comprises: (b) subsequent to the performing of the determination of conditional compromisability for the network-node-set, selecting a target network node from the group of potential target nodes; (c) selecting a potential attacking network node from the plurality of network nodes of the networked system which are already determined to be compromisable by the attacker prior to the performing of the determination of conditional compromisability for the network-node-set; (d) checking whether the selected potential attacking network node can communicate with the selected target network node to the extent required for exploiting the vulnerability corresponding to the selected target network node; (e) in response to determining that the selected potential attacking network node can communicate with the selected target network node to the extent required, determining that the selected target network node is compromisable by the attacker; (f) determining the way for the attacker to compromise the networked system, wherein the way for the attacker to compromise the networked system includes a step of compromising the selected target network node using the vulnerability corresponding to the selected target network node; and (g) reporting the determined way for the attacker to compromise the networked system, the reporting comprising at least one operation selected from the group consisting of (i) causing a display device to display a report including information about the determined way to compromise the networked system, (ii) recording the report including the information about the determined way to compromise the networked system in a file, and (iii) electronically transmitting the report including the information about the determined way to compromise the networked system.

In some embodiments, the selected potential attacking network node can be determined to be compromisable by the attacker during the executing of the penetration testing campaign. In some embodiments, the selected potential attacking network node can be determined to be compromisable by the attacker prior to the executing of the penetration testing campaign.

In some embodiments, the network-node-set can include more than one network node.

In some embodiments, it can be that (i) the vulnerability corresponding to the selected target network node requires two-way communication between the selected target network node and any network node that exploits the vulnerability in the selected target network node, and (ii) the selected potential attacking network node can communicate with the selected target network node in both directions.

In some embodiments, it can be that (i) the vulnerability corresponding to the selected target network node requires communication to the selected target network node from any network node that exploits the vulnerability in the selected target network node, and (ii) the selected potential attacking network node can communicate with the selected target network node at least in the forward direction.

In some embodiments, the network-node-set can include all network nodes of the networked system that are not already determined to be compromisable by the attacker prior to the performing of the determination of conditional compromisability for the network-node-set.

In some embodiments, the network-node-set can be a proper subset of the group of all network nodes of the networked system that are not already determined to be compromisable by the attacker prior to the performing of the determination of conditional compromisability for the network-node-set. In some such embodiments, the network-node-set can include only network nodes that contain corresponding valuable resources.

In some embodiments, it can be that for a group of network nodes that is a non-empty subset of the network-node-set, the performing of the determination of conditional compromisability for each given network node in the group of network nodes comprises: (i) obtaining data about the given network node; (ii) identifying, based on the obtained data about the given network node, a group of one or more potential vulnerabilities that may be applicable to the given network node; and (iii) validating, based on the obtained data about the given network node, that there is at least one vulnerability in the group of one or more potential vulnerabilities which could be exploited for successfully compromising the given network node by any already-compromised node that can communicate with the given network node to the extent required for exploiting the at least one vulnerability. In some such embodiments, all of the obtained data about the given network node used by the validating can be obtained prior to the identifying of the group of one or more potential vulnerabilities that may be applicable to the given network node. In other such embodiments, at least some of the obtained data about the given network node used by the validating can be obtained subsequent to the identifying of the group of one or more potential vulnerabilities that may be applicable to the given network node. In both cases, it can be that (i) the penetration testing system comprises (A) a penetration testing software module installed on a remote computing device and (B) a reconnaissance agent software module installed on at least some network nodes of the plurality of network nodes, and (ii) the obtained data about the given network node is collected by the reconnaissance agent software module installed on the given network node.

In some embodiments in which the penetration testing system comprises a penetration testing software module installed on a remote computing device, the method steps labelled (a) through (g) can be carried out by the penetration testing software module installed on the remote computing device.

In some embodiments, the performing of the determination of conditional compromisability for the network-node-set can include performing a determination of conditional compromisability for a first network node and performing a determination of conditional compromisability for a second network node, wherein the performing of the determination of conditional compromisability for the first network node ends before the performing of the determination of conditional compromisability for the second network node starts.

In some embodiments, the performing of the determination of conditional compromisability for the network-node-set can include performing a determination of conditional compromisability for a first network node and performing a determination of conditional compromisability for a second network node, wherein the performing of the determination of conditional compromisability for the first network node starts before and ends after the performing of the determination of conditional compromisability for the second network node starts.

In some embodiments, the method can further comprise: (h) subsequent to the performing of the determination of conditional compromisability for the network-node-set, performing a second determination of conditional compromisability for a second network-node-set comprising one or more network nodes of the plurality of network nodes, thereby identifying a second group of potential target nodes consisting of every network node of the second network-node-set that is determined to be conditionally compromisable; (i) subsequent to the performing of the second determination of conditional compromisability for the second network-node-set, selecting a second target network node from the second group of potential target nodes; (j) selecting a second potential attacking network node from the plurality of network nodes of the networked system that are already determined to be compromisable by the attacker prior to the performing of the second determination of conditional compromisability for the second network-node-set; (k) checking whether the selected second potential attacking network node can communicate with the selected second target network node to the extent required for exploiting the vulnerability corresponding to the selected second target network node; and (l) in response to determining that the selected second potential attacking network node can communicate with the selected second target network node to the extent required, determining that the selected second target network node is compromisable by the attacker, wherein the way for the attacker to compromise the networked system further includes a step of compromising the selected second target network node using the vulnerability corresponding to the selected second target network node. In some such embodiments, the performing of the second determination of conditional compromisability for the second network-node-set can be done subsequent to performing the method steps labelled (b) through (d) for every network node in the group of potential target nodes. In other such embodiments, the performing of the second determination of conditional compromisability for the second network-node-set can be done in response to the number of network nodes of the group of potential target nodes for which method steps (b) through (d) were performed reaching a given threshold. In still other such embodiments, the performing of the second determination of conditional compromisability for the second network-node-set can be done in response to the time since the start or end of the performing of the determination of conditional compromisability for the network-node-set reaching a given threshold.

In some embodiments, the selecting of the target network node from the group of potential target nodes can be based on the corresponding vulnerability that was determined to be exploitable in the selected target network node. In some embodiments, the selecting of the target network node from the group of potential target nodes can be based on one or more resources of the selected target network node. In some embodiments, the selecting of the target network node from the group of potential target nodes can be based on a location of the selected target network node in the networked system. In some embodiments, the selecting of the target network node from the group of potential target nodes can be based on data about the selected target network node.

In some embodiments, the selecting of the potential attacking network node from the plurality of network nodes that are already determined to be compromisable by the attacker prior to the performing of the determination of conditional compromisability for the network-node-set can be based on a location of the selected potential attacking network node in the networked system. In some embodiments, the selecting of the potential attacking network node from the plurality of network nodes that are already determined to be compromisable by the attacker prior to the performing of the determination of conditional compromisability for the network-node-set can be based on data about the selected potential attacking network node.

In some embodiments, the method can further comprise: prior to the selecting of the potential attacking network node from the plurality of network nodes that are already determined to be compromisable prior to the performing of the determination of conditional compromisability for the network-node-set, forcing one or more user-defined network nodes of the plurality of network nodes of the networked system to become already-compromisable.

In some embodiments, the selecting of the potential attacking network node from the plurality of network nodes that are already determined to be compromisable by the attacker prior to the performing of the determination of conditional compromisability for the network-node-set can comprise selecting a special network node that corresponds to a computing device that is external to the networked system.

According to embodiments, a penetration testing system is disclosed for executing a penetration testing campaign in a networked system so as to determine a way for an attacker to compromise the networked system, the networked system comprising a plurality of network nodes. The penetration system comprises: (a) a remote computing device comprising a computer memory and one or more processors, the remote computing device in electronic communication with at least some network nodes of the plurality of network nodes of the networked system; and (b) a penetration-testing non-transitory computer-readable storage medium having stored therein program instructions of a penetration testing software module, which when executed by the one or more processors of the remote computing device cause the one or more processors of the remote computing device to carry out the following steps: (i) performing a determination of conditional compromisability for a network-node-set comprising one or more network nodes of the plurality of network nodes, the performing of the determination of conditional compromisability for the network-node-set including: (A) for each given network node of the network-node-set, performing a determination of conditional compromisability for the given network node by determining whether the given network node can be compromised by the attacker (1) using a corresponding vulnerability applicable to the given network node, and (2) from a network node of the plurality of network nodes that (a) is already determined to be compromisable by the attacker prior to the performing of the determination of conditional compromisability for the network-node-set and (b) can communicate with the given network node to the extent required for exploiting the corresponding vulnerability in the given network node, and (B) identifying a group of potential target nodes consisting of every network node of the network-node-set that is determined to be conditionally compromisable; (ii) subsequent to the performing of the determination of conditional compromisability for the network-node-set, selecting a target network node from the group of potential target nodes; (iii) selecting a potential attacking network node from the plurality of network nodes of the networked system which are already determined to be compromisable by the attacker prior to the performing of the determination of conditional compromisability for the network-node-set; (iv) checking whether the selected potential attacking network node can communicate with the selected target network node to the extent required for exploiting the vulnerability corresponding to the selected target network node; (v) in response to determining that the selected potential attacking network node can communicate with the selected target network node to the extent required, determining that the selected target network node is compromisable by the attacker; (vi) determining the way for the attacker to compromise the networked system, wherein the way for the attacker to compromise the networked system includes a step of compromising the selected target network node using the vulnerability corresponding to the selected target network node; and (vii) reporting the determined way for the attacker to compromise the networked system, the reporting comprising at least one operation selected from the group consisting of (A) causing a display device to display a report including information about the determined way to compromise the networked system, (B) recording the report including the information about the determined way to compromise the networked system in a file, and (C) electronically transmitting the report including the information about the determined way to compromise the networked system.

In some embodiments, the selected potential attacking network node can be determined to be compromisable by the attacker during the executing of the penetration testing campaign. In some embodiments, the selected potential attacking network node can be determined to be compromisable by the attacker prior to the executing of the penetration testing campaign.

In some embodiments, the network-node-set can include more than one network node.

In some embodiments, it can be that (i) the vulnerability corresponding to the selected target network node requires two-way communication between the selected target network node and any network node that exploits the vulnerability in the selected target network node, and (ii) the selected potential attacking network node can communicate with the selected target network node in both directions.

In some embodiments, it can be that (i) the vulnerability corresponding to the selected target network node requires communication to the selected target network node from any network node that exploits the vulnerability in the selected target network node, and (ii) the selected potential attacking network node can communicate with the selected target network node at least in the forward direction.

In some embodiments, the network-node-set can include all network nodes of the networked system that are not already determined to be compromisable by the attacker prior to the performing of the determination of conditional compromisability for the network-node-set.

In some embodiments, the network-node-set can be a proper subset of the group of all network nodes of the networked system that are not already determined to be compromisable by the attacker prior to the performing of the determination of conditional compromisability for the network-node-set.

In some such embodiments, the network-node-set can include only network nodes that contain corresponding valuable resources.

In some embodiments, the performing of the determination of conditional compromisability for any given network node in the network-node-set can include: (i) obtaining data about the given network node; (ii) identifying, based on the obtained data about the given network node, a group of one or more potential vulnerabilities that may be applicable to the given network node; and (iii) validating, based on the obtained data about the given network node, that there is at least one vulnerability in the group of one or more potential vulnerabilities which could be exploited for successfully compromising the given network node by any already-compromised node that can communicate with the given network node to the extent required for exploiting the at least one vulnerability. In some such embodiments, it can be that all of the obtained data about the given network node used by the validating is obtained prior to the identifying of the group of one or more potential vulnerabilities that may be applicable to the given network node. In other such embodiments, it can be that at least some of the obtained data about the given network node used by the validating is obtained subsequent to the identifying of the group of one or more potential vulnerabilities that may be applicable to the given network node. In both cases, the penetration testing system can further comprise a reconnaissance-agent non-transitory computer-readable storage medium having stored therein program instructions of a reconnaissance-agent software module which when executed by one or more processors of any specific network node on which the reconnaissance-agent software module is installed cause the one or more processors of the specific network node to collect data about the specific network node, wherein the obtained data about the given network node comprises at least some of the data collected by the one or more processors of the given network node.

In some embodiments, it can be that the performing of the determination of conditional compromisability for the network-node-set includes performing a determination of conditional compromisability for a first network node and performing a determination of conditional compromisability for a second network node, wherein the performing of the determination of conditional compromisability for the first network node ends before the performing of the determination of conditional compromisability for the second network node starts.

In some embodiments, it can be that the performing of the determination of conditional compromisability for the network-node-set includes performing a determination of conditional compromisability for a first network node and performing a determination of conditional compromisability for a second network node, wherein the performing of the determination of conditional compromisability for the first network node starts before and ends after the performing of the determination of conditional compromisability for the second network node starts.

In some embodiments, execution of the program instructions of the penetration testing software module by the one or more processors of the remote computing device can cause the one or more processors of the remote computing device to additionally carry out the following steps: (viii) subsequent to the performing of the determination of conditional compromisability for the network-node-set, performing a second determination of conditional compromisability for a second network-node-set comprising one or more network nodes of the plurality of network nodes, thereby identifying a second group of potential target nodes consisting of every network node of the second network-node-set that is determined to be conditionally compromisable; (ix) subsequent to the performing of the second determination of conditional compromisability for the second network-node-set, selecting a second target network node from the second group of potential target nodes; (x) selecting a second potential attacking network node from the plurality of network nodes of the networked system that are already determined to be compromisable by the attacker prior to the performing of the second determination of conditional compromisability for the second network-node-set; (xi) checking whether the selected second potential attacking network node can communicate with the selected second target network node to the extent required for exploiting the vulnerability corresponding to the selected second target network node; (xii) in response to determining that the selected second potential attacking network node can communicate with the selected second target network node to the extent required, determining that the selected second target network node is compromisable by the attacker, wherein the way for the attacker to compromise the networked system further includes a step of compromising the selected second target network node using the vulnerability corresponding to the selected second target network node. In some such embodiments, the performing of the second determination of conditional compromisability for the second network-node-set can be done subsequent to performing steps ii-iv for every network node in the group of potential target nodes. In other such embodiments, the performing of the second determination of conditional compromisability for the second network-node-set can be done in response to the number of network nodes of the group of potential target nodes for which steps ii-iv were performed reaching a given threshold. In still other such embodiments, the performing of the second determination of conditional compromisability for the second network-node-set can be done in response to the time since the start or end of the performing of the determination of conditional compromisability for the network-node-set reaching a given threshold.

In some embodiments, the selecting of the target network node from the group of potential target nodes can be based on the corresponding vulnerability that was determined to be exploitable in the selected target network node.

In some embodiments, the selecting of the target network node from the group of potential target nodes can be based on one or more resources of the selected target network node.

In some embodiments, the selecting of the target network node from the group of potential target nodes can be based on a location of the selected target network node in the networked system.

In some embodiments, the selecting of the target network node from the group of potential target nodes can be based on data about the selected target network node.

In some embodiments, the selecting of the potential attacking network node from the plurality of network nodes that are already determined to be compromisable by the attacker prior to the performing of the determination of conditional compromisability for the network-node-set can be based on a location of the selected potential attacking network node in the networked system.

In some embodiments, the selecting of the potential attacking network node from the plurality of network nodes that are already determined to be compromisable by the attacker prior to the performing of the determination of conditional compromisability for the network-node-set can be based on data about the selected potential attacking network node.

In some embodiments, execution of the program instructions of the penetration testing software module by the one or more processors of the remote computing device can cause the one or more processors of the remote computing device to carry out an additional step of: prior to the selecting of the potential attacking network node from the plurality of network nodes that are already determined to be compromisable prior to the performing of the determination of conditional compromisability for the network-node-set, forcing one or more user-defined network nodes of the plurality of network nodes of the networked system to become already-compromisable.

In some embodiments, the selecting of the potential attacking network node from the plurality of network nodes that are already determined to be compromisable by the attacker prior to the performing of the determination of conditional compromisability for the network-node-set can comprise selecting a special network node that corresponds to a computing device that is external to the networked system.

BRIEF DESCRIPTION OF THE DRAWINGS

The invention will now be described further, by way of example, with reference to the accompanying drawings, in which the dimensions of components and features shown in the figures are chosen for convenience and clarity of presentation and not necessarily to scale. In the drawings:

FIGS. 11A, 11B, 12 and 13 show flowcharts of methods of carrying out penetration testing campaigns of a networked system by a penetration testing system according to embodiments of the present invention.

DETAILED DESCRIPTION OF THE EMBODIMENTS

Note: Throughout this disclosure, subscripted reference numbers (e.g., $10_1$) or letter-modified reference numbers (e.g., $100a$) may be used to designate multiple separate appearances of elements in a single drawing, e.g. $10_1$ is a single appearance (out of a plurality of appearances) of element 10, and likewise 100a is a single appearance (out of a plurality of appearances) of element 100.

Figure 1:
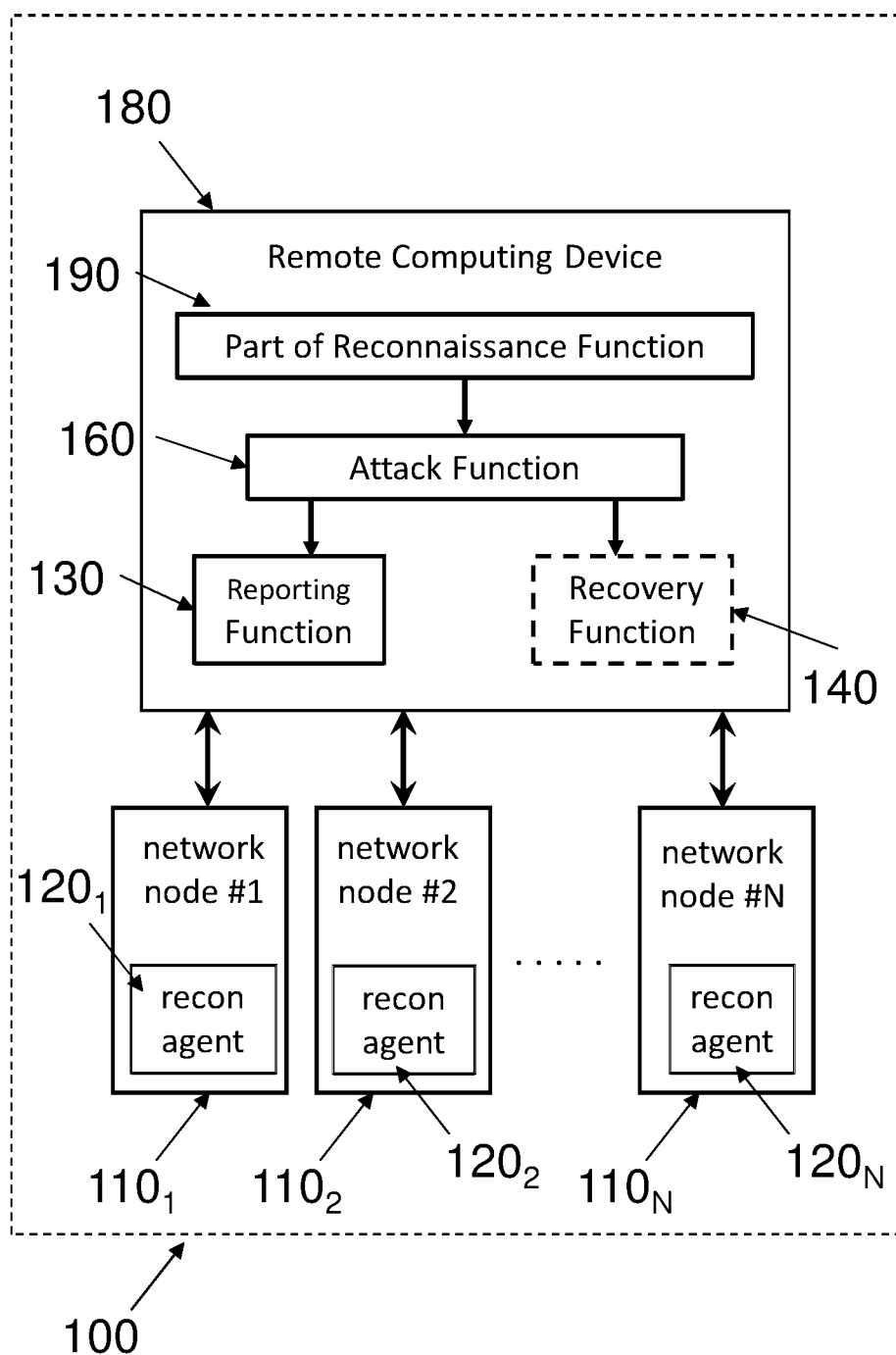
FIG. 1 is a functional block diagram of a reconnaissance agent penetration testing system which may employ embodiments of the present invention.

Referring now to the figures, and in particular to FIG. 1, a functional block diagram of a penetration testing system 100 is shown according to some embodiments, comprising a reconnaissance function as defined as definition "14" in the Definitions Section later in this specification. The reconnaissance function includes functionality in reconnaissance agents 120 ($120_1$, $120_2$, ... $120_N$) installed in respective network nodes 110 ($110_1$, $110_2$, ... $110_N$) and, in some embodiments, also includes functionality in a remote computing device 180 in which is installed "part of reconnaissance function" 190. In some embodiments, an attack function 160, as defined as definition "15" in the Definitions Section, a reporting function 130 as defined as definition "16" in the Definitions Section, and optionally a recovery function 140 (also known in the industry as a 'clean-up' function and synonymous therewith), as defined as definition "17" in the Definitions Section, are all installed in the remote computing device 180. As explained in definition "15", an 'attack function' forms part of the architecture of every penetration testing system and performs the function of determining whether one or more security vulnerabilities exist in the tested networked system. In an alternative embodiment (NOT SHOWN), one or more network nodes of the tested networked system act as the remote computing device, so that any or all of the above-listed functions are installed in network nodes 110 instead of in a physically-remote remote computing device 180, or, alternatively, the functionality of the remote computing device 180 of FIG. 1 is split between the physically-remote remote computing device 180 and the network nodes 110.

A reconnaissance agent, or a reconnaissance client agent, which is synonymous therewith, is a software module designed to be installed in nodes of the tested networked system. A reconnaissance client agent is able to communicate with a remote computing device hosting a penetration testing software module responsible, among other things, for managing and conducting the penetration testing process. A reconnaissance client agent can report, to the penetration testing software module when installed on the remote computing device, data extracted by the agent from its hosting node.

Figure 2:
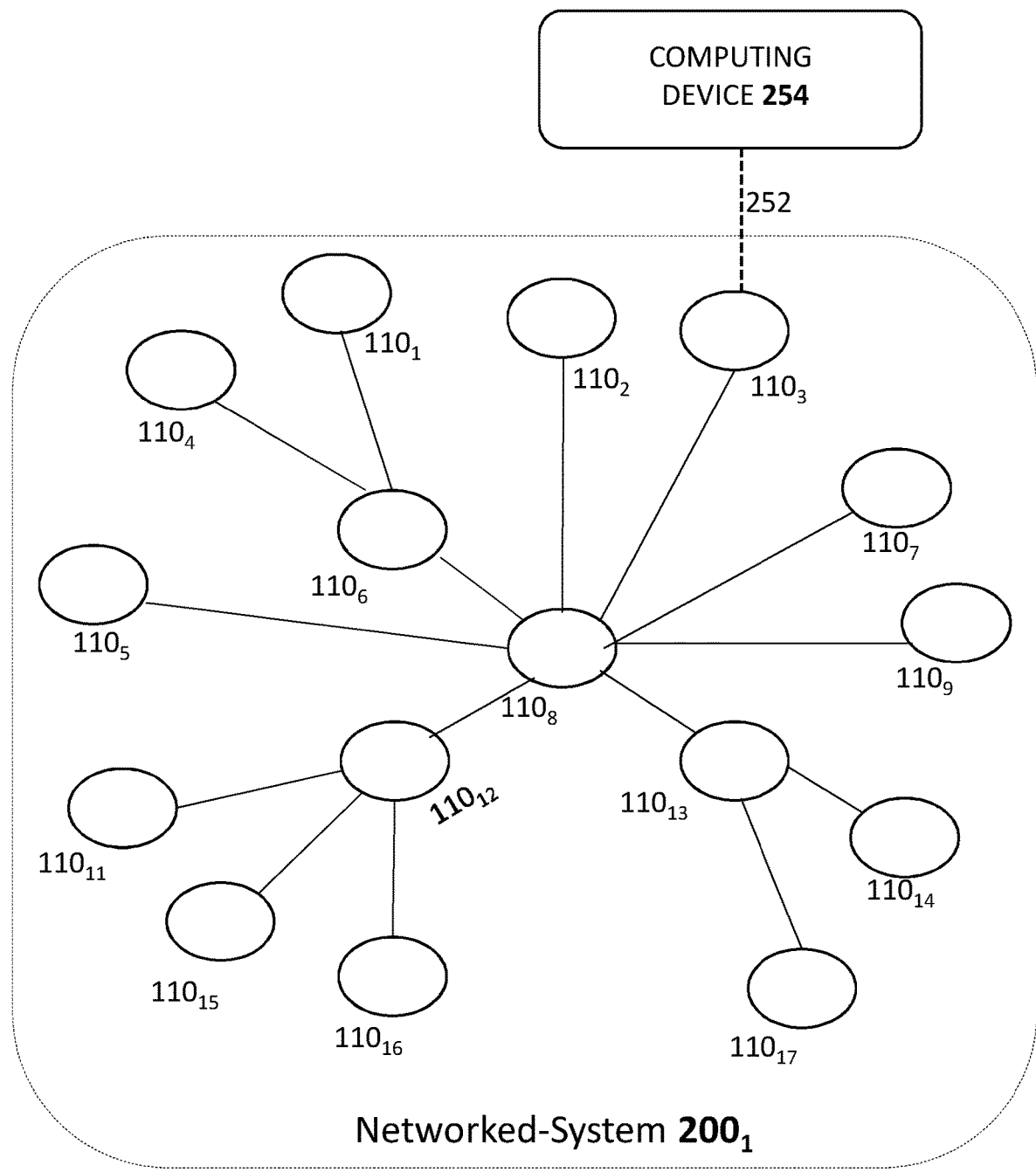
FIG. 2 shows a schematic illustration of a networked system that may be tested according to embodiments of the present invention.

Referring now to FIG. 2, a remote computing device 254 of a penetration testing system 100 is in communication (via communications link 252) with a plurality of networked nodes 110 of networked system $200_1$. Communications link 252 can include any combination of wired and wireless technologies; in some embodiments link 252 can be an Internet connection and remote computing device 254 can be a general-purpose computer server located at a data center or shared server location, for example 'in the cloud.' The number of network nodes 110 can be as few as two and as many as several hundred or several thousand. They can be connected hierarchically, peer-to-peer, hub-and-spoke, or in any combination of connections as long as each networked node 110 is connected to at least one other node 110. The seemingly direct connection of remote computer 254 with Node $110_3$ shown in FIG. 2 is for convenient illustration purposes only, and any communications link described herein can be made, as is known in the art, with one or more network nodes, with a router or gateway, in any other networking configuration that facilitates direct or indirect communication with each of the respective nodes 110 in networked system $200_1$. The physical location of remote computing device 254 is unimportant. It can be, by way of non-limiting examples, at a physical location belonging to a supplier or operator of a penetration testing system, in a 'cloud' server farm of an Internet services or cloud services provider, or it can be physically co-located with some or all of the network nodes 110.

A penetration testing system of the present invention, according to embodiments, implements the determination of which node shall be the next one to attempt to compromise, in a more efficient way than the prior art penetration testing systems.

In embodiments of the present invention, a phase of determination of conditional compromisability is carried out by examining multiple network nodes of the tested networked system. For each given node examined in the determination-of-conditional-compromisability phase, a determination is made whether that given node could be currently compromised using some corresponding vulnerability by any already-compromised network node that can communicate with the given node.

This determination is referred to herein and in the appended claims as a "determination of conditional compromisability", the term indicating that the determined compromisability is conditional upon the ability of an already-compromised network node to communicate with the given node.

The first occurrence in a campaign of a determination of conditional compromisability of a set of network nodes may be performed prior to the first iteration of the penetration testing campaign, in which case it is called "a preliminary determination of conditional compromisability". The determinations of conditional compromisability, regardless of being preliminary or not, are independent of the state of the campaign. In other words, those determinations are independent of the existence of already-compromisable nodes, i.e., nodes that are already determined to be compromisable. In still other words, a given node is conditionally compromisable if it has a vulnerability that can be exploited from an already-compromisable node that can reach the given node, regardless if such node currently exists in the current campaign.

The multiple network nodes for which a determination of conditional compromisability is carried out may be all the nodes of the tested networked system that are not yet determined to be compromisable (which for the preliminary determination of conditional compromisability may be all the nodes of the tested networked system). Alternatively, the multiple network nodes for which a determination of conditional compromisability is carried out may be only a proper sub-set of the nodes of the tested networked system that are not yet determined to be compromisable (e.g., only the nodes containing valuable resources, when not every node contains a valuable resource).

In some embodiments, determining whether a given node could be conditionally compromised using some corresponding vulnerability by any already-compromised network node that can communicate with the given node includes the steps of: (i) obtaining data about the characteristics, status and/or current conditions of the given node, possibly including internal data of the given node, (ii) identifying, based on the obtained data, a group of potential vulnerabilities that may be applicable to the given node, and (iii) validating that according to current data about the given node, there is at least one vulnerability in the group of potential vulnerabilities which could be exploited by any already-compromised node that can communicate with the given node for successfully compromising the given node.

For example, for a specific node which is examined in the determination-of-conditional-compromisability phase, in the first step of the above three steps data about the specific node is obtained. The data may include, and not exhaustively, the type and version of the Operating System, the type and version of the default Internet browser, a list of Internet ports to which the specific node listens, a list of services provided by the specific node to other nodes, a list of security defensive applications installed, certain values from the registry, etc.

Based on the data obtained about the specific node, the second step of the above three steps includes consulting a vulnerabilities knowledge base, looking for potential vulnerabilities that may be applicable for the specific node. Note that at this step, conditions that may dynamically change in the specific node are still not taken into account. For example, if the obtained data says that the specific node runs a Windows XP Operating System version X, and the vulnerabilities knowledge base includes a vulnerability that is applicable to a node running Windows XP version X, provided that the node listens and responds to incoming messages of type Y received on Internet port Z, then that vulnerability is considered to be a potential vulnerability for the specific node, even though we do not know yet (i.e., the penetration testing system has not yet ascertained) whether the condition of listening to messages of type Y on port Z is currently satisfied for the specific node.

In the third step of the above three steps, current data obtained about conditions of the specific node that may dynamically change is used for determining whether each of the potential vulnerabilities of the specific node is currently exploitable. In the above example, if current internal data obtained about the specific node tells us that the specific node is currently providing a service on port Z whose protocol requires processing of incoming messages of type Y, then it is concluded by the determination-of-conditional-compromisability phase that the specific node could be currently compromised using some vulnerability by any already-compromised network node that can communicate with the specific node.

In the above three steps of the determination-of-conditional-compromisability phase, data about a node is used in both the second and the third steps. In some embodiments, the data needed for both steps are obtained at the same time, for example in the first step that is carried out prior to the second step. However, this is not mandatory, and in other embodiments the dynamic data required for the third step is obtained subsequent to the second step, separately from obtaining the data required for the second step.

In some embodiments, the second step is completed for all examined nodes before starting the third step (as presented in the above explanation). However, this is not mandatory, and in other embodiments the second and third steps are done for one node before starting the second step for the next node. In other words, in these other embodiments, for a first node and a second node examined in the determination-of-conditional-compromisability phase, the order of operations is: (i) identifying a group of potential vulnerabilities that are applicable to the first node, (ii) validating that according to current conditions in the first node, there is at least one vulnerability in the group of potential vulnerabilities applicable to the first node, which could be used by any already-compromised node that can communicate with the first node for successfully compromising the first node, (iii) identifying a group of potential vulnerabilities that are applicable to the second node, and (iv) validating that according to current conditions in the second node, there is at least one vulnerability in the group of potential vulnerabilities applicable to the second node, which could be used by any already-compromised node that can communicate with the second node for successfully compromising the second node.

Returning now to the third step of the above three steps, for each potential vulnerability of the potential vulnerabilities collected in the second step for a specific node, if it is determined that the potential vulnerability is currently exploitable in the specific node according to the current conditions in the specific node, then that vulnerability is added to a group of applicable vulnerabilities of the specific node. As multiple potential vulnerabilities can be found to be currently exploitable in a node, the group of applicable vulnerabilities of a node may end up including multiple vulnerabilities. In another embodiment, once one potential vulnerability is found to be currently exploitable in the specific node, all other potential vulnerabilities of that specific node are dropped and not further checked. In such an embodiment, the group of applicable vulnerabilities of a node can include only a single vulnerability. In both embodiments, the specific node (which has a corresponding non-empty group of applicable vulnerabilities) is added to a group of potential target nodes.

If all the potential vulnerabilities collected in the second step for the specific node are determined to be non-applicable (according to current conditions in the specific node), then that specific node is not added to the group of potential target nodes and is ignored in the upcoming iterations of the campaign.

The attempt to construct a corresponding group of currently exploitable vulnerabilities is performed for each node which is examined in the determination-of-conditional-compromisability phase. Thus, the end result of the determination-of-conditional-compromisability phase is a group of potential target nodes, where each node in that group of potential target nodes has a corresponding non-empty group of currently exploitable vulnerabilities. In the first embodiment described above each such group of currently exploitable vulnerabilities includes one or more vulnerabilities, while in the alternative embodiment it always includes a single vulnerability.

Figure 3:
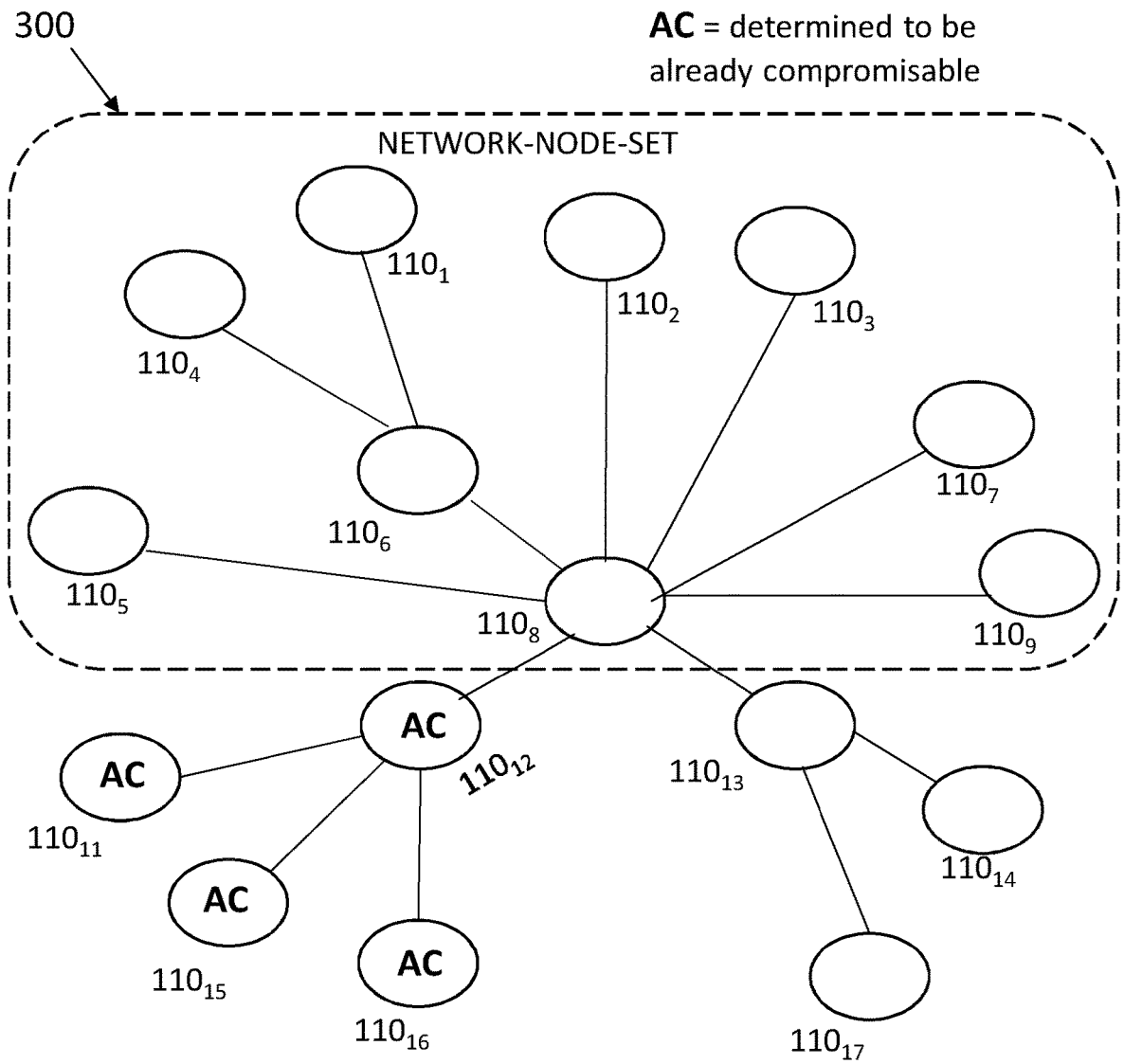
FIGS. 3. 4A, 4B, 5 and 6 show schematic illustrations of networked systems at various stages during an illustrative penetration testing campaign, according to embodiments of the present invention.
Figure 4A:
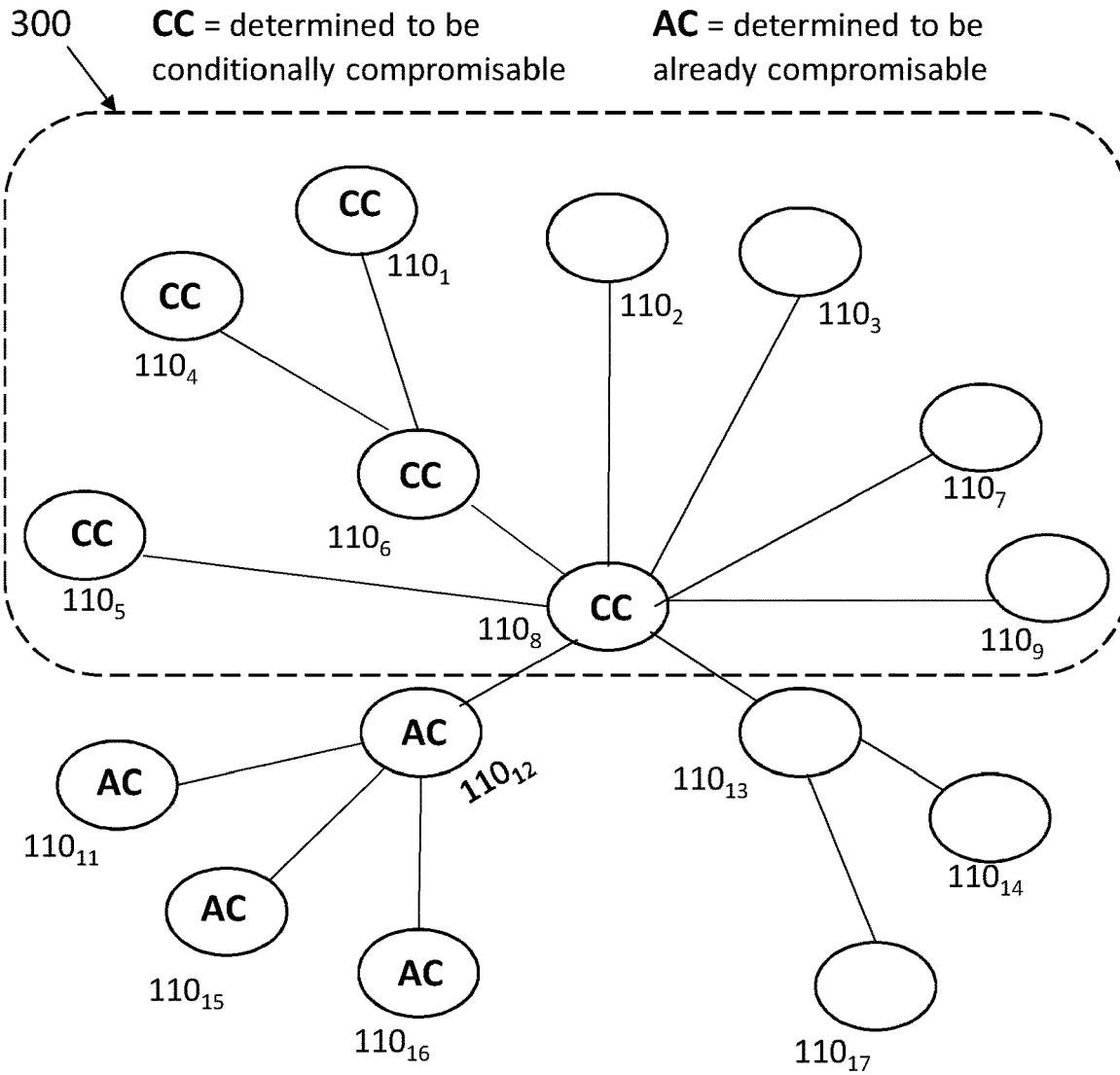
Figure 4B:
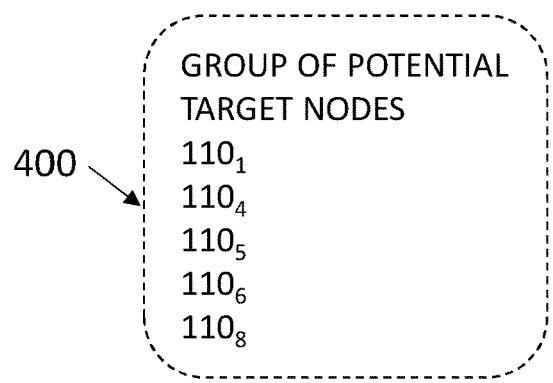

FIGS. 3, 4A and 4B illustrate a non-limiting example of a phase of determination of conditional compromisability in a penetration testing campaign according to some embodiments. In this example, the campaign is executed in the networked system $200_1$ of FIG. 2. Networked system $200_1$ in the example includes 16 network nodes $110_1 \ldots 1109$ and $110_{11} \ldots 110_{17}$. A determination of conditional compromisability can be performed for a network-node-set that can include some or all of the network nodes 110 of a networked system 200. As will be discussed in greater detail hereinbelow, more than one determination of conditional compromisability can be performed during a campaign and even if any one such determination is limited to a specific network-node-set, that doesn't mean that other network nodes not included in the network-node-set couldn't be included in a different network-node-set in connection with a subsequent determination of conditional compromisability. In the example of FIG. 3, a network-node-set 300 includes 9 network nodes 110, specifically network nodes $110_1 \ldots 110_9$. At the time that the determination phase starts, 4 nodes ($110_{11}$, $110_{12}$, $110_{15}$, and $110_{16}$) are already known to be compromised. An already-comprised node can be known to be already compromised in one of several ways, including, but not exhaustively: having been found to be already compromised/compromisable in a previous penetration testing campaign; having been found to be already compromised/compromisable in a previous iteration in the current penetration testing campaign; or having been 'assigned' by the campaign operator to be 'initially-compromised' when the campaign starts. FIG. 4A continues with the same example and shows a snapshot of the networked system $200_1$ after the determination of conditional compromisability is completed. A group 400 of potential target nodes (see FIG. 4B) comprises 5 nodes ($110_1$, $110_4$, $110_5$, $110_6$, $110_8$) which were determined to be conditionally compromisable, implying that their respective identified vulnerability/ies can be exploited from an already-compromised attacking node in communication therewith.

After completing the determination-of-conditional-compromisability phase, the penetration testing campaign continues with an iterations phase. In each iteration, one target node is selected from the group of potential target nodes and becomes the target node for the current iteration. As the selected target node is a member of the group of potential target nodes, it has a corresponding non-empty group of currently exploitable vulnerabilities. In other words, we already know at this stage that it can be compromised by any already-compromised node that can communicate with it. Therefore, the only thing one needs to look for at this stage is an already-compromised node that can communicate with the selected target node.

Figure 5:
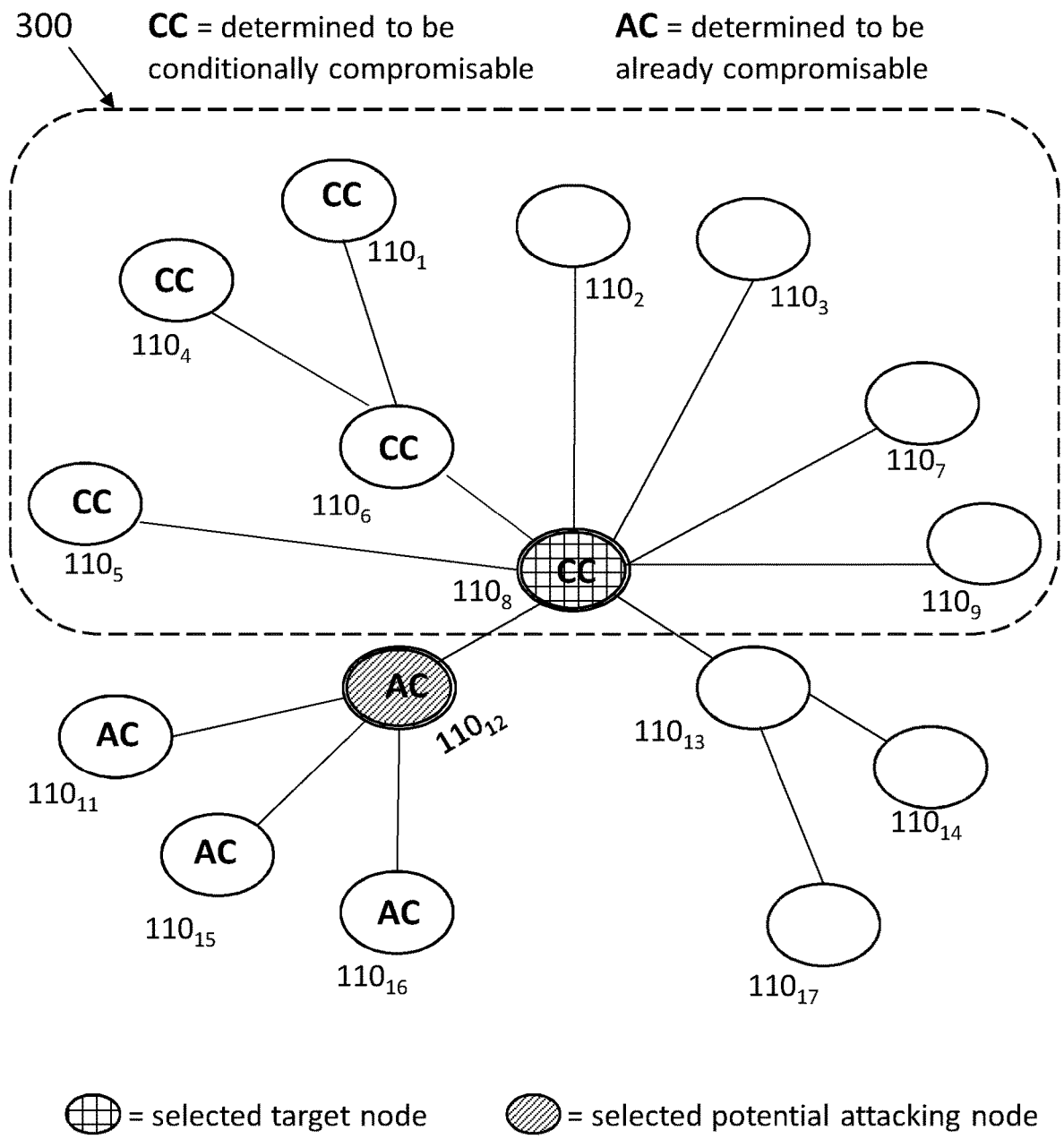

Consequently, an already-compromised node is selected as a potential attacking node and checked for being able to communicate with the selected target node. FIG. 5 continues the example penetration testing campaign partly illustrated in FIGS. 3 and 4, and shows, during an exemplary iteration, that conditionally-compromised network node $110_8$, a member of the group 400 of potential target nodes, has been chosen as the selected target node, and already-compromised node $110_{12}$ is selected as a potential attacking node.

Figure 6:
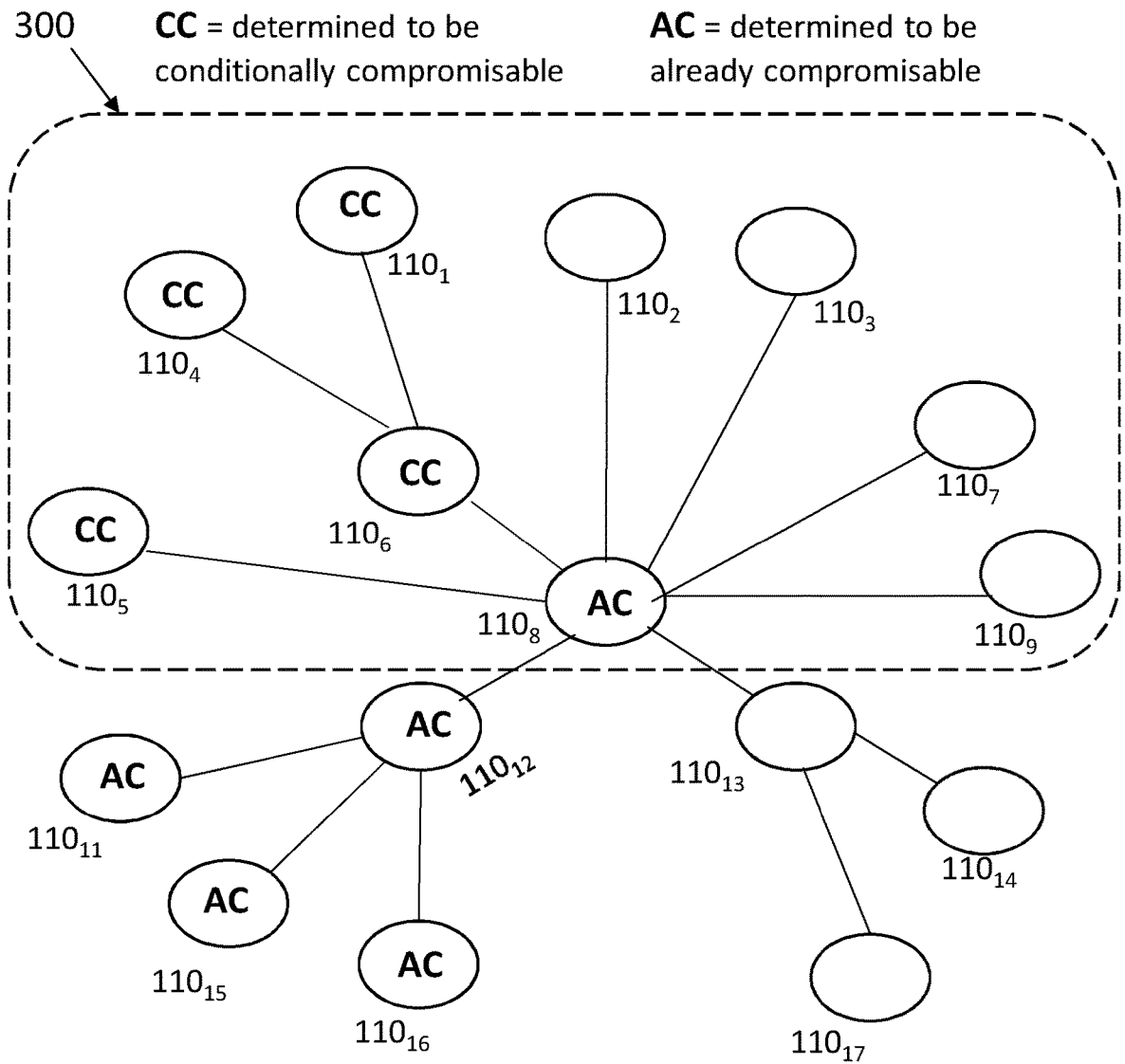

If the potential attacking node is able to communicate with the selected target node, then the selected target node is determined to be compromisable. The determination of compromisability includes adding the selected target node to the list of already compromised nodes and removing it from the group of potential target nodes. In this case, the current iteration of the campaign is finished, and the next iteration starts with selecting another target node from the group of potential target nodes. FIG. 6 illustrates the status of the network nodes at the end of the exemplary iteration of FIG. 5, whereby previously conditionally compromisable node $110_8$ is now 'already compromised' after it was found that the potential attacking node, i.e., node $110_{12}$ was indeed able to communicate with it.

If it is determined that the selected already-compromised potential attacking node is unable to communicate with the selected target node, then the current campaign iteration continues with selecting another already-compromised attacking node and checking its ability to communicate with the selected target node. These sub-iterations of selecting an already compromised potential attacking node and checking it for being able to communicate with the selected target node are repeated until we find an already-compromised node that can communicate with the selected target node or until we run out of already-compromised nodes. If we run out of already-compromised nodes, then it is determined that the selected target node cannot be compromised (at least in the current stage of the campaign), which determination causes removal of the selected target node from the group of potential target nodes, ending the current iteration of the campaign and starting the next iteration with selecting another target node from the group of potential target nodes.

If after finishing an iteration of the campaign it is found that there are no more potential target nodes in the group of potential target nodes, then no new iteration can be started. In other words, the results of the determination-of-conditional-compromisability phase were exhausted, and no more progress can be made in the campaign, unless a new determination-of-conditional-compromisability phase is done.

It should be noted that there are two types of vulnerabilities with respect to communications from attacking nodes. A first type of vulnerability requires only one-way communication between an attacking node and an attacked node in order to exploit the vulnerability in the attacked node. For example, the attacking node may send a poisoned message to a given port of the attacked node, and the mere fact of processing the message by the attacked node causes the attacked node to be compromised, without requiring the sending back of any message from the attacked node to the attacking node. A second type of vulnerability requires two-way communication in order to exploit the vulnerability in the attacked node. For example, the attacking node may send a poisoned message to a given port of the attacked node, and the processing of the message by the attacked node causes the attacked node to export a given confidential file to the attacking node (without compromising the attacked node in any other way).

Consequently, the determination of whether the selected already-compromised potential attacking node can communicate with the selected target node should be done differently according to the vulnerabilities being exploited. If the group of currently exploitable vulnerabilities corresponding to the selected target node includes at least one exploitable vulnerability that requires only (i.e., at least) one-way communication from the potential attacking node to the selected target node in order to be exploited, then it is only required to find out about communication from the selected potential attacking node to the selected target node. But if the group of currently exploitable vulnerabilities corresponding to the selected target node includes only vulnerabilities requiring two-way communication in order to be exploited, then it is additionally required to find out about communication back from the selected target node to the selected potential attacking node.

In some embodiments, the determination-of-conditional-compromisability phase examines all the nodes of the tested networked system that are of interest for the testing. In such case, exhaustion of the results of the determination-of-conditional-compromisability phase implies the campaign has completed its objectives and has reached its end. In other embodiments, the determination-of-conditional-compromisability phase examines only a proper subset of the nodes of interest. In such a case, once the results of a determination-of-conditional-compromisability phase are exhausted (i.e. no more nodes in the group of potential target nodes), another determination-of-conditional-compromisability phase is carried out, putting new nodes into the group of potential target nodes. This cyclic process of carrying out a determination-of-conditional-compromisability phase, using the results for determining compromisable nodes, carrying out another determination-of-conditional-compromisability phase, and using the new results for determining new compromisable nodes, can be repeated any desired number of times or until there are no more nodes to examine for compromisability.

Exhaustion of the results of a determination-of-conditional-compromisability phase, i.e., completion of checking whether potential attacking network nodes can communicate with each and every network node of the network-node-set that is determined to be conditionally compromisable by the determination-of-conditional-compromisability phase, is not necessarily the only possible reason for conducting additional determination-of-conditional-compromisability phases. In some embodiments, the results of a determination-of-conditional-compromisability phase may be considered valid only for a pre-defined number of campaign iterations (i.e. a pre-defined number of nodes being checked for compromisability) in the iterations phase of the campaign, and the campaign is designed to repeat the determination-of-conditional-compromisability phase once that number of iterations are over. In still other embodiments, the results of a determination-of-conditional-compromisability phase may be considered valid only for a pre-defined time interval (either from the start or the end of that determination-of-conditional-compromisability phase), repeating the determination-of-conditional-compromisability phase once that time interval is over. The reasoning behind the repeating of the determination-of-conditional-compromisability phase is that as this phase depends on conditions that may dynamically change (e.g. a node may stop providing a service and consequently stop listening on an Internet port), the validity of the results of a determination-of-conditional-compromisability phase might deteriorate with time and they should better be periodically refreshed in order to provide high reliability results reflecting current conditions in the tested networked system.

It should be noted that a node that was removed from the group of potential target nodes because it was determined to be non-compromisable (because the penetration testing system could not find any already-compromisable node that can communicate with that node), may become compromisable in a later stage of the campaign, if additional nodes become compromisable. This can happen because a newly-compromised node may be able to communicate with the previously unreachable node, or because a new vulnerability may become exploitable as a result of changes in dynamic conditions in the node. Therefore, a new determination-of-conditional-compromisability phase may look at nodes that were already examined in a previous determination-of-conditional-compromisability phase and found to be non-compromisable. In some embodiments, all the tasks performed by a determination-of-conditional-compromisability phase for examining a node are repeated whenever that node is examined again. This is typically the case in embodiments in which an unreachable target node is removed from the group of potential target nodes (as was explained above). In other embodiments, some outputs of the repeating of tasks are saved for later use—for example, results of the task of collecting non-dynamic data about the node. In some such embodiments, this is implemented by not removing an unreachable node from the group of potential target nodes, but instead by marking it in a way that does not allow selecting it again as the next target node until after a new determination-of-conditional-compromisability phase has been performed.

It should be noted that the term "lateral movement strategy" has a somewhat different meaning when used herein with respect to the present invention than it has in prior art penetration testing systems. In prior art systems, the strategy decides the selection of the next target node from candidate nodes that are all reachable from nodes that are already known to be compromisable. This implies that the target node is selected and validated for potential vulnerabilities after it was determined to be reachable from an already compromisable node. In contrast, in the present invention, the target node is first selected and validated for potential vulnerabilities, and only after that it is checked for being reachable from an already-compromisable node. Thus, the strategy according to embodiments of the present invention decides both (i) the order in which nodes in the group of potential target nodes are selected to be the next target node, and (ii) the order in which already-compromised nodes are checked for being able to communicate with an already selected target node. According to embodiments of the present invention, the strategy causes progress to be made during a penetration testing campaign by answering the question "can an attacker reach, from some already-compromised node, a node already known to be vulnerable?" rather than the question "can an attacker compromise a node (that we don't yet know to be vulnerable) that is reachable from some already-compromised node?"

In embodiments of the present invention, the considerations involved in selecting the next target node may be based on any combination of (and not exhaustively): an exploitable vulnerability corresponding to the selected target node (e.g. the probability of success of a certain vulnerability, or the complexity of exploiting a certain vulnerability), the importance of the selected target node (e.g. the importance of the resources it contains), the location of the selected target node in the tested networked system (e.g. the importance of the sub-network it is residing in), known data about the selected target node (e.g. its operating system or services it provides to other nodes), etc.

The considerations involved in selecting the next already-compromised node to check for communication with an already selected target node may be based on any combination of (and not exhaustively): the location of the selected already-compromisable node in the tested networked system (e.g. the sub-network it is residing in), known data about the selected already-compromisable node (e.g. whether it has administration rights for its sub-network), etc.

As each iteration of the campaign includes looking for an already-compromised node that can communicate with the current target network node, one must address the question of how the first iteration of the campaign is carried out.

One solution is to instruct the penetration testing system to carry out the campaign under the assumption that one or more user-defined nodes are already considered to be compromisable when starting the campaign. For example, commonly assigned U.S. Pat. No. 10,122,750 discloses a penetration testing system that operates this way.

Another solution is to include in the group of already-compromised nodes a special member representing the external world (i.e. representing all the computing devices existing outside the tested networked system). Consequently, in the first iteration of a campaign the group of already-compromised nodes consists of this special node. Therefore, in the first iteration the proposed solution will (after selecting the first target node) look for connectivity from the external world to the first target node, and if found—conclude that the tested networked system can be breached by compromising the first target node. It should be noted that the special node representing the external world may be left in the group of already-compromised nodes even after determining a first "regular" compromisable node. This is so because an attack from an external computing device is still possible even in later stages of the campaign. When using such special node in testing a networked system whose nodes are programmed to employ stricter precautions when receiving a message from an external node, it may be required to employ different methods of validation for vulnerabilities utilized from an external node and for vulnerabilities utilized from an internal node of the tested networked system.

The preliminary determination-of-conditional-compromisability phase (and subsequent determination-of-conditional-compromisability phases, if they exist) can be performed in any type of penetration testing system, but they are especially suited to implementation in reconnaissance agent penetration testing systems (see definition in the Definitions section). This is so because the reconnaissance agents of such system reside in network nodes of the tested networked system and have easy access to data of their hosting nodes, including to internal data of their hosting nodes. Thus, the agents make the obtaining of data about the nodes (the first step of a determination-of-conditional-compromisability phase) pretty straight-forward.

Notably, even if most of the network nodes in a tested network are difficult to compromise, with only a minority of the nodes being "weak spots" that allow attackers to make progress in their attack by compromising them, the disclosed embodiments provide an efficient solution because in most cases a given network node is validated for a given vulnerability only once. This is so because the validation of a given network node for a given vulnerability under current conditions (done during a determination-of-conditional-compromisability phase) serves multiple reachability tests conducted for multiple already-compromised nodes selected as potential attack nodes.

The present solution can include multiple steps of determining whether a given first node can reached by a given second node. Such determinations may be achieved by any method known in the art. For example, the penetration testing software module installed on the penetration testing system's remote computing device may carry out a mapping phase before starting the campaign, during which phase the connectivity structure of the tested networked system is determined by monitoring network traffic and/or by sending queries that trigger response messages from selected nodes. Additionally or alternatively, the user may manually input information regarding the networked system connectivity. If the penetration testing system is a reconnaissance agent penetration testing system, then the agents may be used to advantage in determining connectivity of nodes by exchanging dedicated messages whose only use is the determination of connectivity. In such case of using agents, the determinations of nodes connectivity may be done prior to starting the campaign or during the execution of the campaign.

Figure 7:
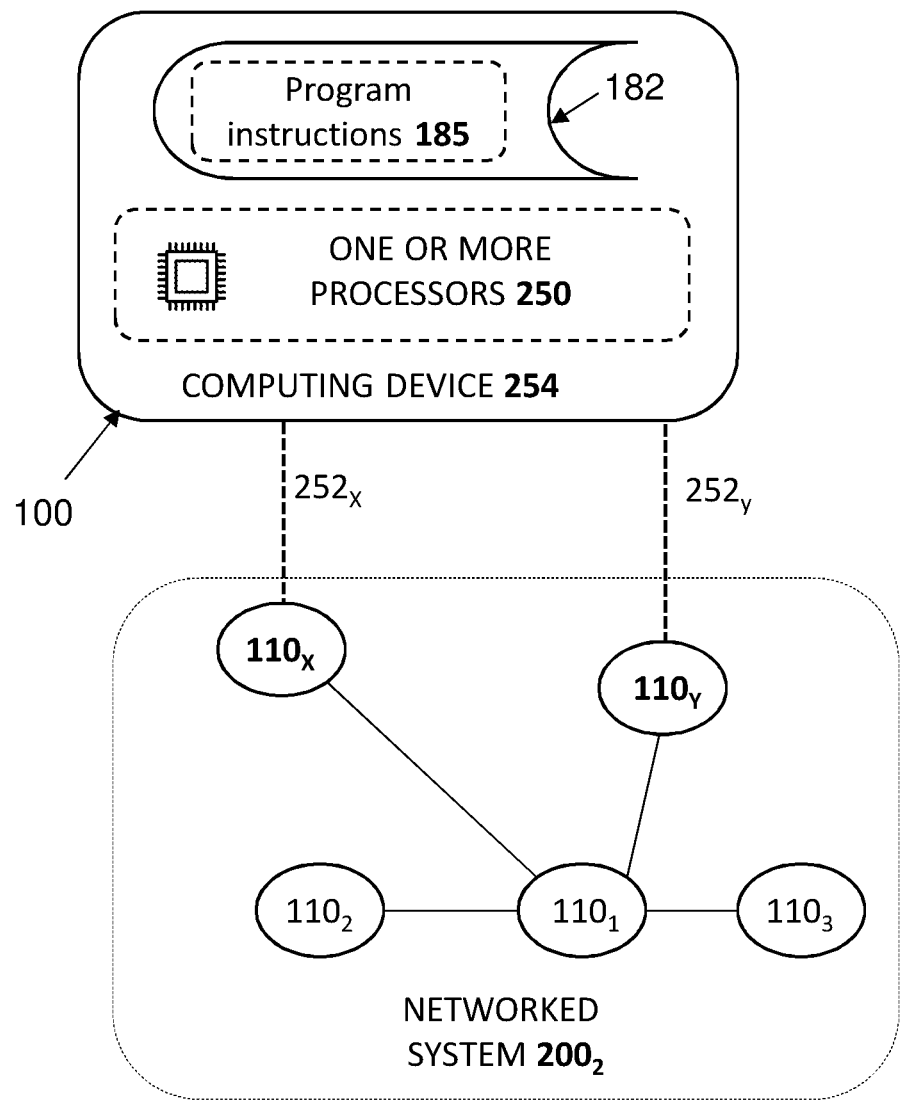
FIG. 7 shows a schematic illustration of a networked system that may be tested according to embodiments of the present invention and its connection to a penetration testing system, according to embodiments of the present invention.
Figure 8A:
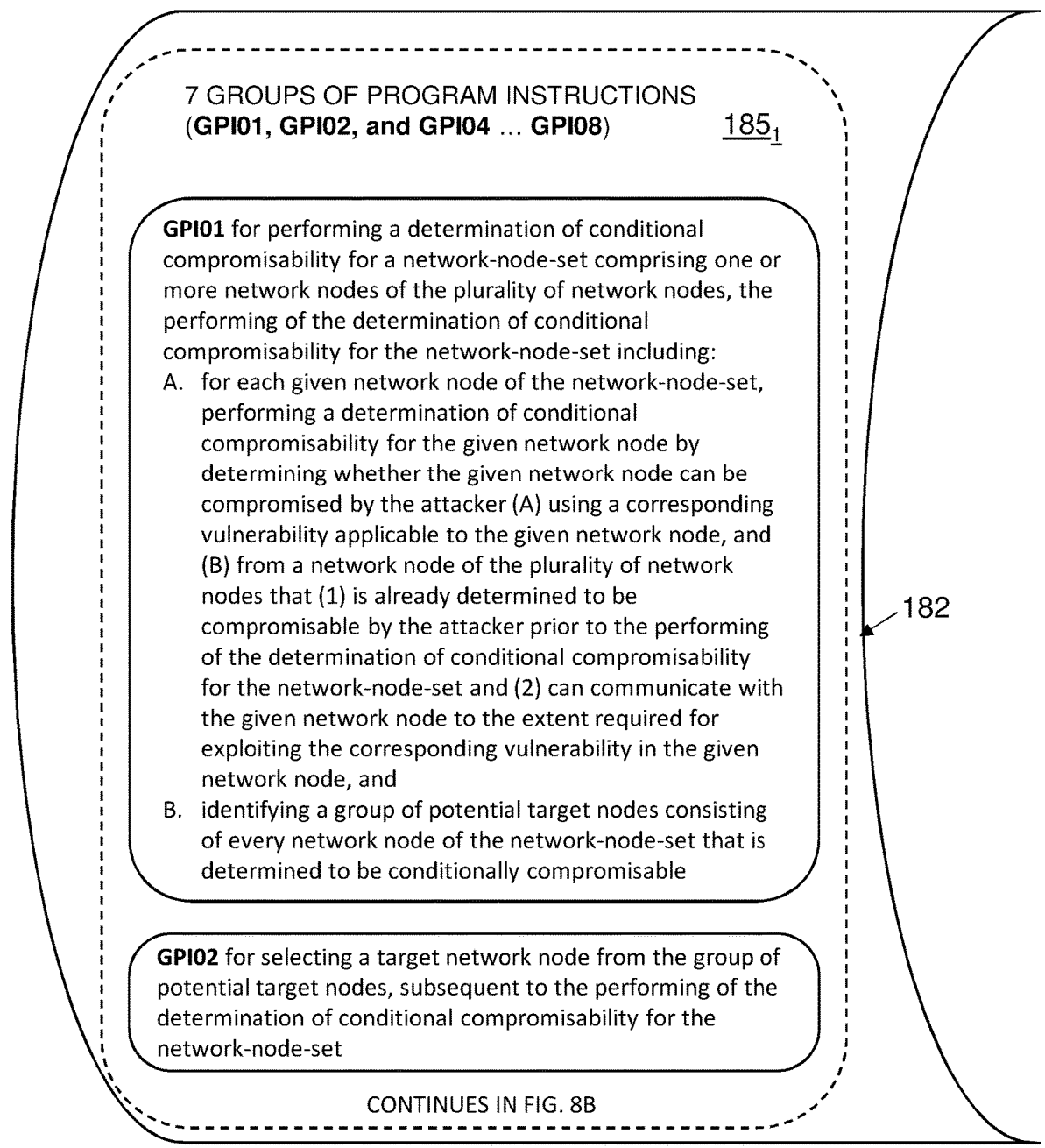
FIGS. 8A and 8B together show a block diagram of a non-transitory computer-readable storage medium comprising respective program instructions according to embodiments of the present invention.
Figure 8B:
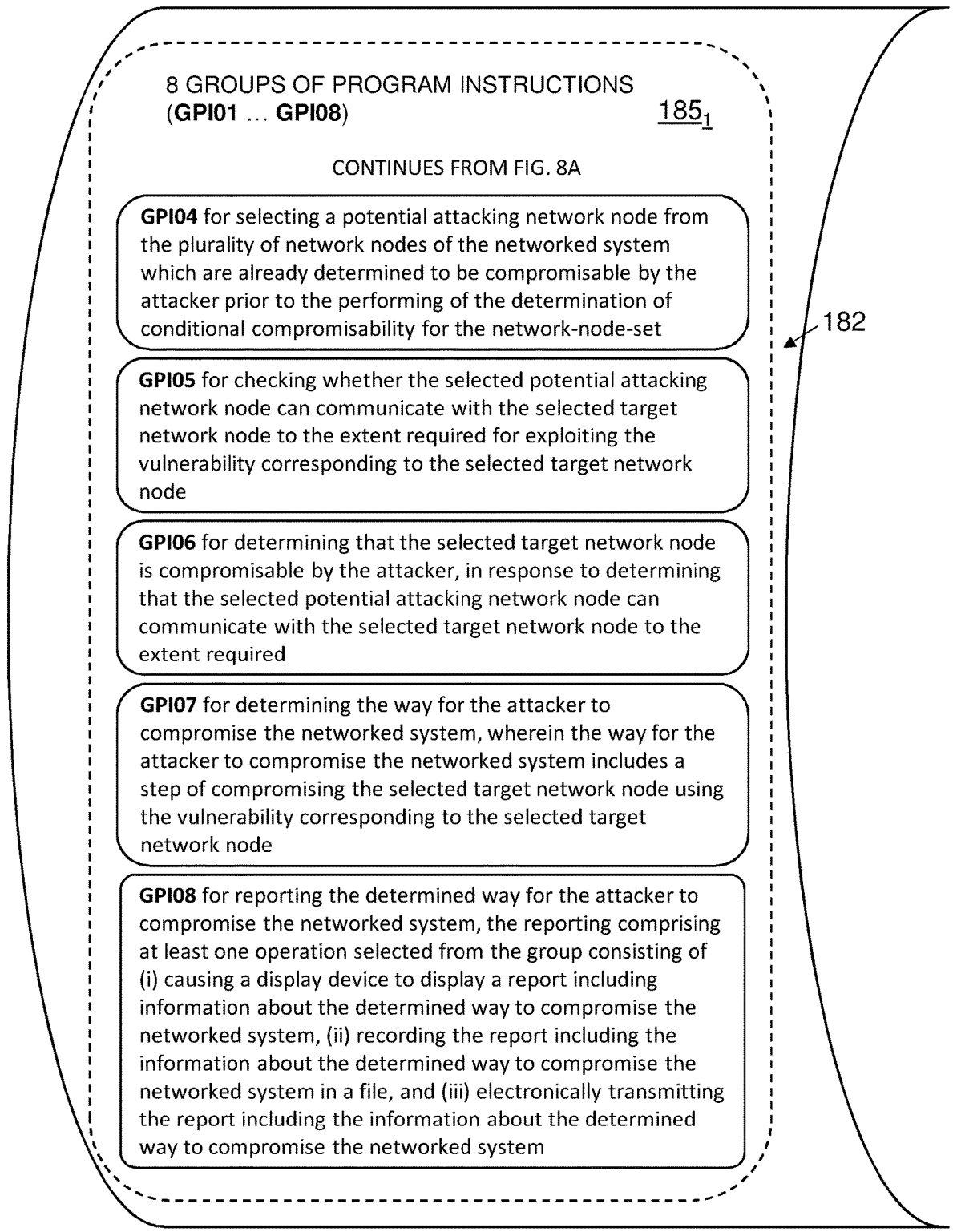

Components of a penetration testing system 100 according to some embodiments are illustrated in FIGS. 7, 8A and 8B. The penetration testing system 100 itself comprises computing device 254, which comprises one or more processors 250, and non-transitory computer-readable storage medium 182. The storage medium 182 is shown for convenience as being part of the remote computing device 254 but it can be anywhere as long as the one or more processors 250 can access and execute the program instructions 185 stored therein. First network node $110_X$ of networked system $200_2$ is in electronic communication with computing device 254 (by communications arrangement $252_X$ which can be an Internet connection or a LAN connection or any other suitable connection, including an indirect connection). Second network node $110_Y$ is also in electronic communication with computing device 254 (by communications arrangement $252_Y$ which can be the same as communications arrangement $252_X$ or separate and/or different). In some embodiments, the penetration system 100 additionally comprises reconnaissance agent software modules 120, as illustrated, for example, in FIG. 1.

As illustrated in the block diagram of FIGS. 8A and 8B, storage medium 182 includes program instructions $185_1$, which include 7 groups of program instructions GPI01, GPI01, and GPI04 . . . GPI08. Execution of the program instructions 185 by the one or more processors 250 of the computing device 254 causes the one or more processors 250 of the computing device 254 to execute the following groups of program instructions:

GPI01 for performing a determination of conditional compromisability for a network-node-set comprising one or more network nodes of the plurality of network nodes, the performing of the determination of conditional compromisability for the network-node-set including:
  (a) for each given network node of the network-node-set, performing a determination of conditional compromisability for the given network node by determining whether the given network node can be compromised by the attacker (A) using a corresponding vulnerability applicable to the given network node, and (B) from a network node of the plurality of network nodes that (1) is already determined to be compromisable by the attacker prior to the performing of the determination of conditional compromisability for the network-node-set and (2) can communicate with the given network node to the extent required for exploiting the corresponding vulnerability in the given network node, and
  (b) identifying a group of potential target nodes consisting of every network node of the network-node-set that is determined to be conditionally compromisable GPI02 for selecting a target network node from the group of potential target nodes, subsequent to the performing of the determination of conditional compromisability for the network-node-set.

GPI04 for selecting a potential attacking network node from the plurality of network nodes of the networked system which are already determined to be compromisable by the attacker prior to the performing of the determination of conditional compromisability for the network-node-set.

GPI05 for checking whether the selected potential attacking network node can communicate with the selected target network node to the extent required for exploiting the vulnerability corresponding to the selected target network node.

GPI06 for determining that the selected target network node is compromisable by the attacker, in response to determining that the selected potential attacking network node can communicate with the selected target network node to the extent required.

GPI07 for determining the way for the attacker to compromise the networked system, wherein the way for the attacker to compromise the networked system includes a step of compromising the selected target network node using the vulnerability corresponding to the selected target network node.

GPI08 for reporting the determined way for the attacker to compromise the networked system, the reporting comprising at least one operation selected from the group consisting of (i) causing a display device to display a report including information about the determined way to compromise the networked system, (ii) recording the report including the information about the determined way to compromise the networked system in a file, and (iii) electronically transmitting the report including the information about the determined way to compromise the networked system.

In some embodiments, and as illustrated in FIG. 8A, program instructions $185_1$ can also include group of program instructions GPI03 for forcing one or more user-defined network nodes of the plurality of network nodes of the networked system to become already-compromisable when the campaign starts. If present and executed, the execution of GPI03 can take place before the execution of GPI04. Program instructions GPI03 are useful when a preliminary determination of conditional compromisability is employed, as the nodes forced to be already-compromisable when the campaign starts can serve as a pool from which the potential attacking network node can be selected.

Figure 9:
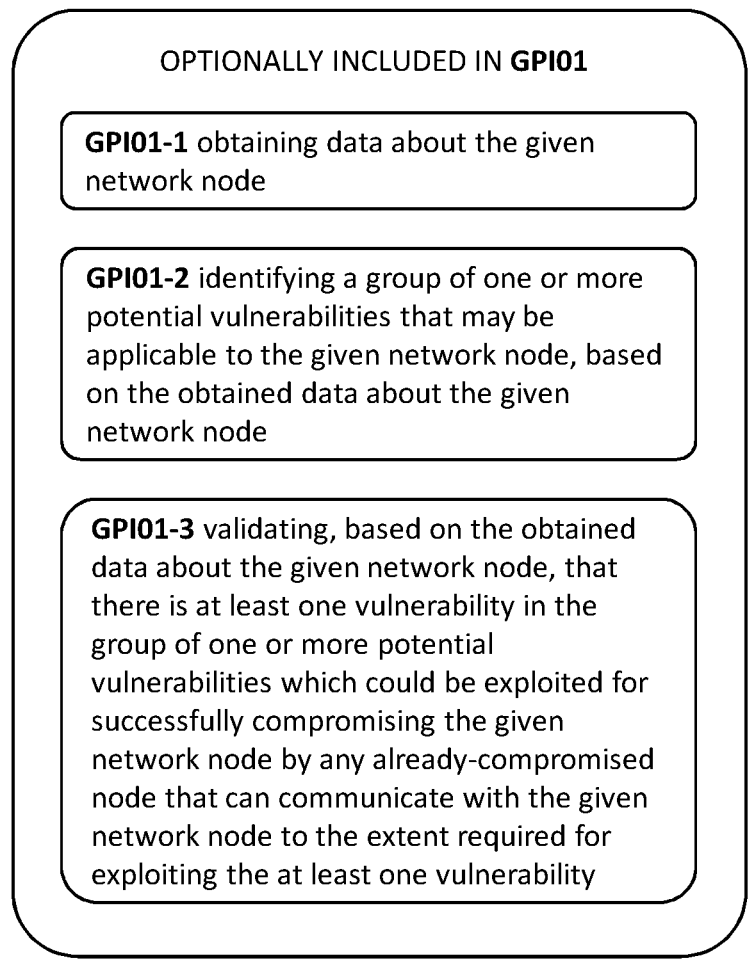
FIGS. 9 and 10 show, respectively, an alternative group of program instructions and an additional group of program instructions, either or both of which can be optionally stored in the non-transitory computer-readable storage medium of FIGS. 8A and 8B according to embodiments of the present invention.

In some embodiments, execution of the group of program instructions GPI01 by the one or more processors 250 of the computing device 254 can include execution, for each given network node of the network-node-set, of the following 3 sub-groups of program instructions (illustrated in FIG. 9):

Sub-group GPI01-1 for obtaining data about the given network node;

Sub-group GPI01-2 for identifying a group of one or more potential vulnerabilities that may be applicable to the given network node, based on the obtained data about the given network node; and Sub-group GPI01-3 for validating, based on the obtained data about the given network node, that there is at least one vulnerability in the group of one or more potential vulnerabilities which could be exploited for successfully compromising the given network node by any already-compromised node that can communicate with the given network node to the extent required for exploiting the at least one vulnerability.

Figure 10:
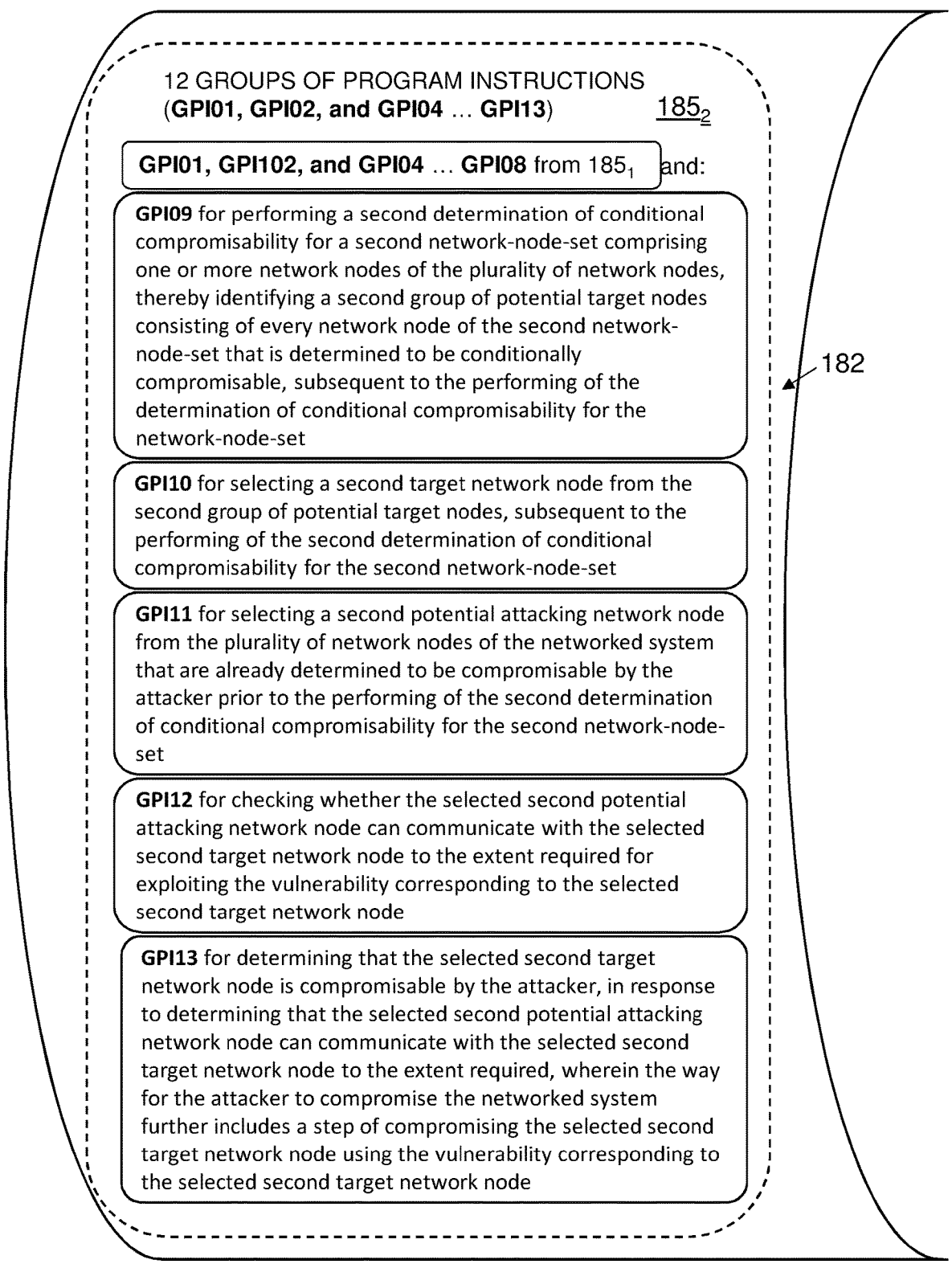
Figure 12:
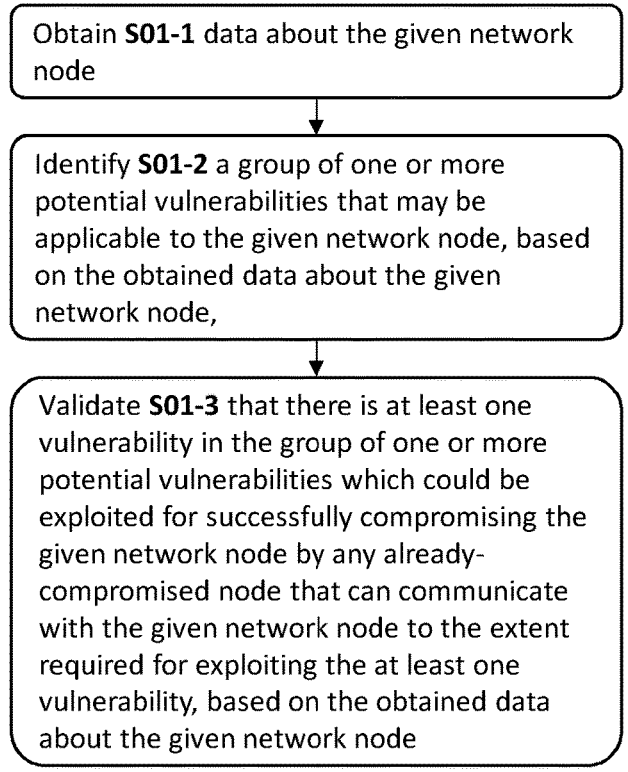
Figure 13:
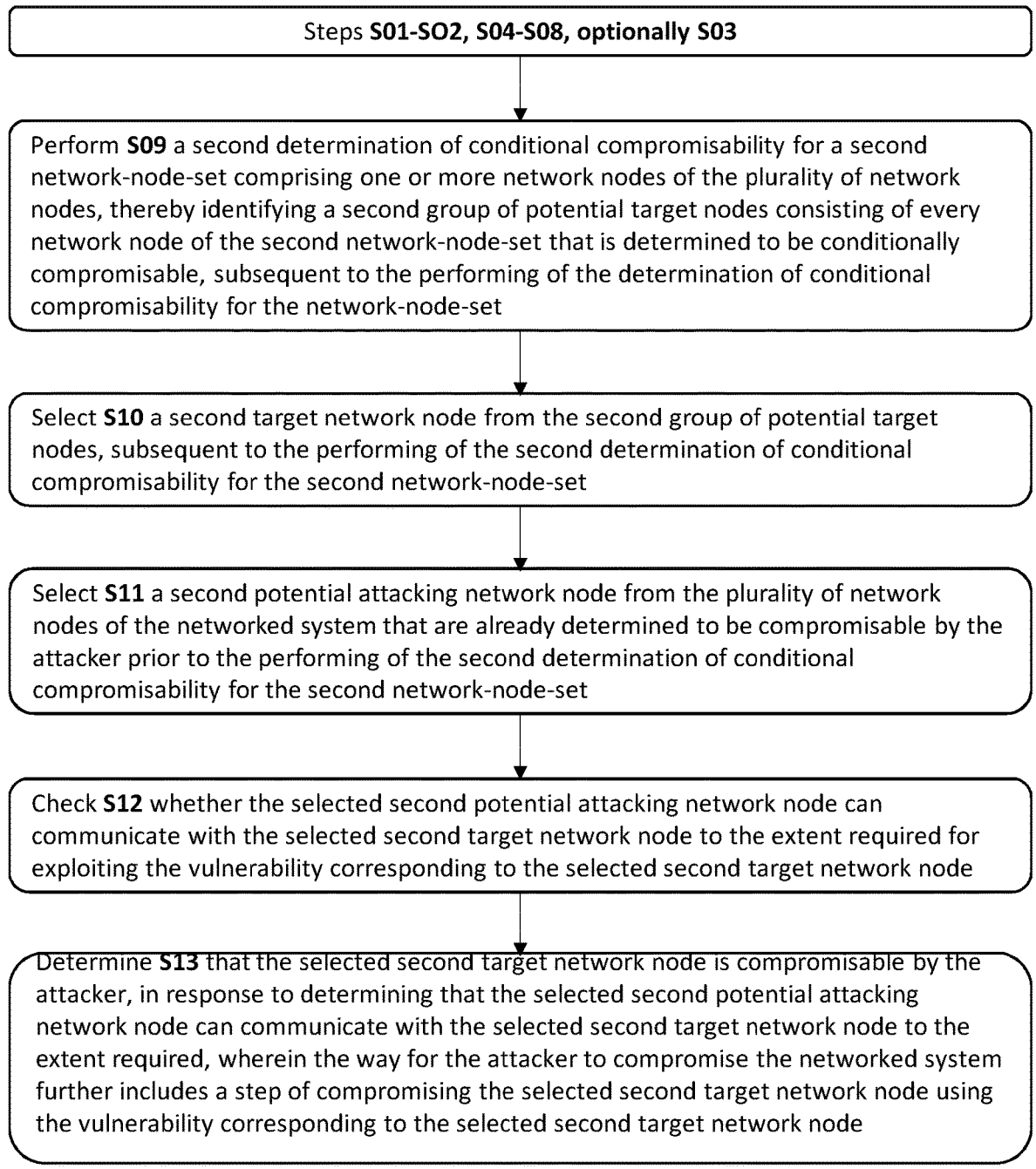

In some embodiments, as illustrated in FIG. 10, program instructions 185 can include 5 additional groups of program instructions GPI09. GPI13 for execution by the one or more processors 250 of the computing device 254. The five additional groups of program instructions are for conducting multiple phases of determination of conditional compromisability within the same penetration testing campaign:

GPI09 for performing a second determination of conditional compromisability for a second network-node-set comprising one or more network nodes of the plurality of network nodes, thereby identifying a second group of potential target nodes consisting of every network node of the second network-node-set that is determined to be conditionally compromisable, subsequent to the performing of the determination of conditional compromisability for the network-node-set.

GPI10 for selecting a second target network node from the second group of potential target nodes, subsequent to the performing of the second determination of conditional compromisability for the second network-node-set.

GPI11 for selecting a second potential attacking network node from the plurality of network nodes of the networked system that are already determined to be compromisable by the attacker prior to the performing of the second determination of conditional compromisability for the second network-node-set.

GPI12 for checking whether the selected second potential attacking network node can communicate with the selected second target network node to the extent required for exploiting the vulnerability corresponding to the selected second target network node.

GPI13 for determining that the selected second target network node is compromisable by the attacker, in response to determining that the selected second potential attacking network node can communicate with the selected second target network node to the extent required, wherein the way for the attacker to compromise the networked system further includes a step of compromising the selected second target network node using the vulnerability corresponding to the selected second target network node.

Referring now to FIGS. 11A and 11B, a method is disclosed for executing a penetration testing campaign in a networked system 200 by a penetration testing system 100 so as to determine a way for an attacker to compromise the networked system 200 wherein the networked system 200 comprising a plurality of network nodes 110. As illustrated by the flow chart in FIGS. 11A-11B, the method comprises:

Step S01 Performing a determination of conditional compromisability for a network-node-set comprising one or more network nodes of the plurality of network nodes (the network-node-set can include one network node or more than one network node, and/or can include all or some of the network nodes that are not yet—before step S01—already determined to be compromisable by the attacker), the performing of the determination of conditional compromisability for the network-node-set including:

i. for each given network node of the network-node-set performing a determination of conditional compromisability for the given network node by examining the given network node so as to determine whether the given network node can be compromised by the attacker (A) using a corresponding vulnerability applicable to the given network node, and (B) from a network node of the plurality of network nodes that (1) is already determined to be compromisable by the attacker prior to the performing of the determination of conditional compromisability for the network-node-set and (2) can communicate with the given network node to the extent required (which may require at least one-way, i.e., forward-direction, communication, or may require two-way communication) for exploiting the corresponding vulnerability in the given network node, and ii. identifying a group of potential target nodes consisting of every network node of the network-node-set that is determined to be conditionally compromisable.

In some embodiments, the determination for one node is concluded before starting a determination for another node, and in some embodiments the determination of multiple nodes can overlap.

Step S02 Selecting a target network node from the group of potential target nodes, subsequent to the performing of the determination of conditional compromisability for the network-node-set. In some embodiments, the selecting can be based on the corresponding vulnerability that was determined to be exploitable in the selected target network node, and/or one or more resources of the selected target network node and/or a location of the selected target network node in the networked system and/or data about the selected target network node.

Step S04 Selecting a potential attacking network node from the plurality of network nodes of the networked system which are already determined to be compromisable by the attacker prior to the performing of the determination of conditional compromisability for the network-node-set. The selected potential attacking network node can be determined to be compromisable by the attacker during the executing of the penetration testing campaign, or prior to the execution of the penetration testing campaign. In some embodiments, the selecting of the potential attacking network node can be based on a location of the selected potential attacking network node in the networked system and/or on data about the selected potential attacking network node. Additionally or alternatively, the selecting of the potential attacking network node can comprise selecting a special network node that corresponds to a computing device that is external to the networked system.

Step S05 Checking whether the selected potential attacking network node can communicate with the selected target network node to the extent required for exploiting the vulnerability corresponding to the selected target network node.

Step S06 Determining that the selected target network node is compromisable by the attacker, in response to determining that the selected potential attacking network node can communicate with the selected target network node to the extent required.

Step S07 Determining the way for the attacker to compromise the networked system, wherein the way for the attacker to compromise the networked system includes a step of compromising the selected target network node using the vulnerability corresponding to the selected target network node.

Step S08 Reporting the determined way for an attacker to compromise the networked system, the reporting comprising at least one action selected from the actions group consisting of (i) causing a display device to display a report including information about the determined way to compromise the networked system, (ii) recording the report including the information about the determined way to compromise the networked system in a file, and (iii) electronically transmitting the report including the information about the determined way to compromise the networked system.

In some embodiments, optional Step S03 Forcing one or more user-defined network nodes of the plurality of network nodes of the networked system to become already-compromisable, can be carried out before Step S04. As noted above, this step S03 is useful when a preliminary determination of conditional compromisability is employed, as the nodes forced to be already-compromisable when the campaign starts can serve as a pool from which the potential attacking network node can be selected.

In some embodiments, all of Steps S01-S02 and S04-S08 are carried out by the penetration testing software module installed on the remote computing device 254.

In some embodiments, carrying out Step S01 may include, for each given network node of the network-node-set, carrying out the following three sub-steps:

Sub-step S01-1 Obtaining data about the given network node.

Sub-step S01-2 Identifying a group of one or more potential vulnerabilities that may be applicable to the given network node, based on the obtained data about the given network node. In some embodiments, all of the data is obtained prior to the identifying, and in some embodiments at least some of the data is obtained subsequent to the identifying.

Sub-step S01-3 Validating that there is at least one vulnerability in the group of one or more potential vulnerabilities which could be exploited for successfully compromising the given network node by any already-compromised node that can communicate with the given network node to the extent required for exploiting the at least one vulnerability, based on the obtained data about the given network node.

In some embodiments, the method additionally includes the following steps (for conducting multiple phases of determination of conditional compromisability within the same penetration testing campaign):

Step S09 Performing a second determination of conditional compromisability for a second network-node-set comprising one or more network nodes of the plurality of network nodes, thereby identifying a second group of potential target nodes consisting of every network node of the second network-node-set that is determined to be conditionally compromisable, subsequent to the performing of the determination of conditional compromisability for the network-node-set. In some embodiments, this step can hinge on the number of network nodes of the group of potential target nodes for which Steps S02, S04 and S05 were performed reaching a given threshold, and/or on the time elapsed since beginning or ending the conditional-compromisability determination steps related to the first network-node-set, and/or on completing the determination of conditional compromisability (of Step S01) for all of the network nodes of the first network-node-set.

Step S10 Selecting a second target network node from the second group of potential target nodes, subsequent to the performing of the second determination of conditional compromisability for the second network-node-set.

Step S11 Selecting a second potential attacking network node from the plurality of network nodes of the networked system that are already determined to be compromisable by the attacker prior to the performing of the second determination of conditional compromisability for the second network-node-set.

Step S12 Checking whether the selected second potential attacking network node can communicate with the selected second target network node to the extent required for exploiting the vulnerability corresponding to the selected second target network node.

Step S13 Determining that the selected second target network node is compromisable by the attacker, in response to determining that the selected second potential attacking network node can communicate with the selected second target network node to the extent required, wherein the way for the attacker to compromise the networked system further includes a step of compromising the selected second target network node using the vulnerability corresponding to the selected second target network node.

Figure 14:
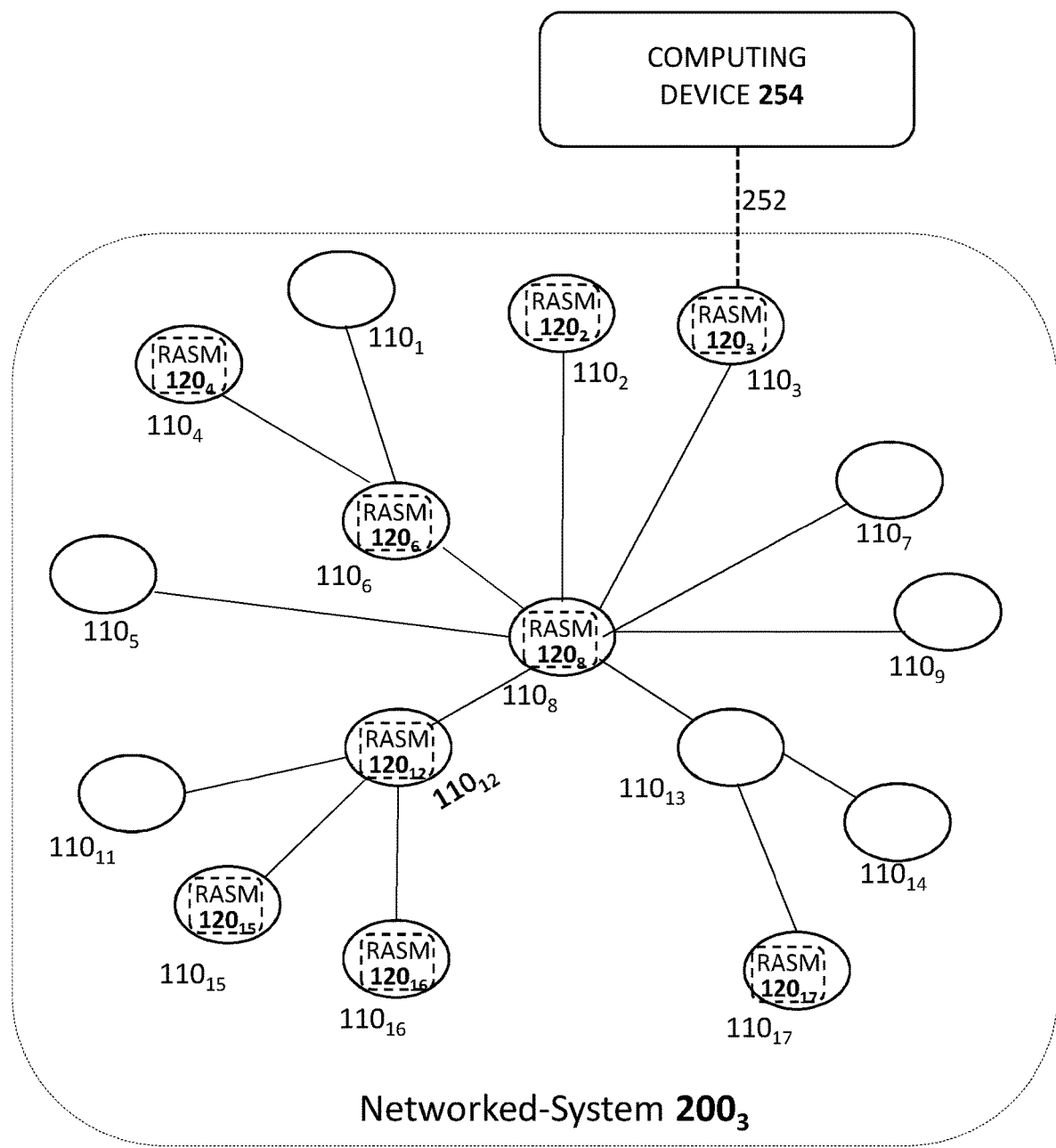
FIGS. 14 and 15 shows a schematic illustration of networked systems including reconnaissance agent software modules installed at some of the nodes of the networked systems, according to embodiments of the present invention.

Referring now to FIG. 14, a schematic diagram of a networked system $200_3$ according to embodiments is shown. Networked system $200_3$ is similar to networked system $200_1$ as diagrammed in FIG. 2, but in networked system $200_3$ a reconnaissance agent software module (RASM) 120 is installed on at least some of the plurality of network nodes 110 shown as part of networked system $200_3$.

Figure 15:
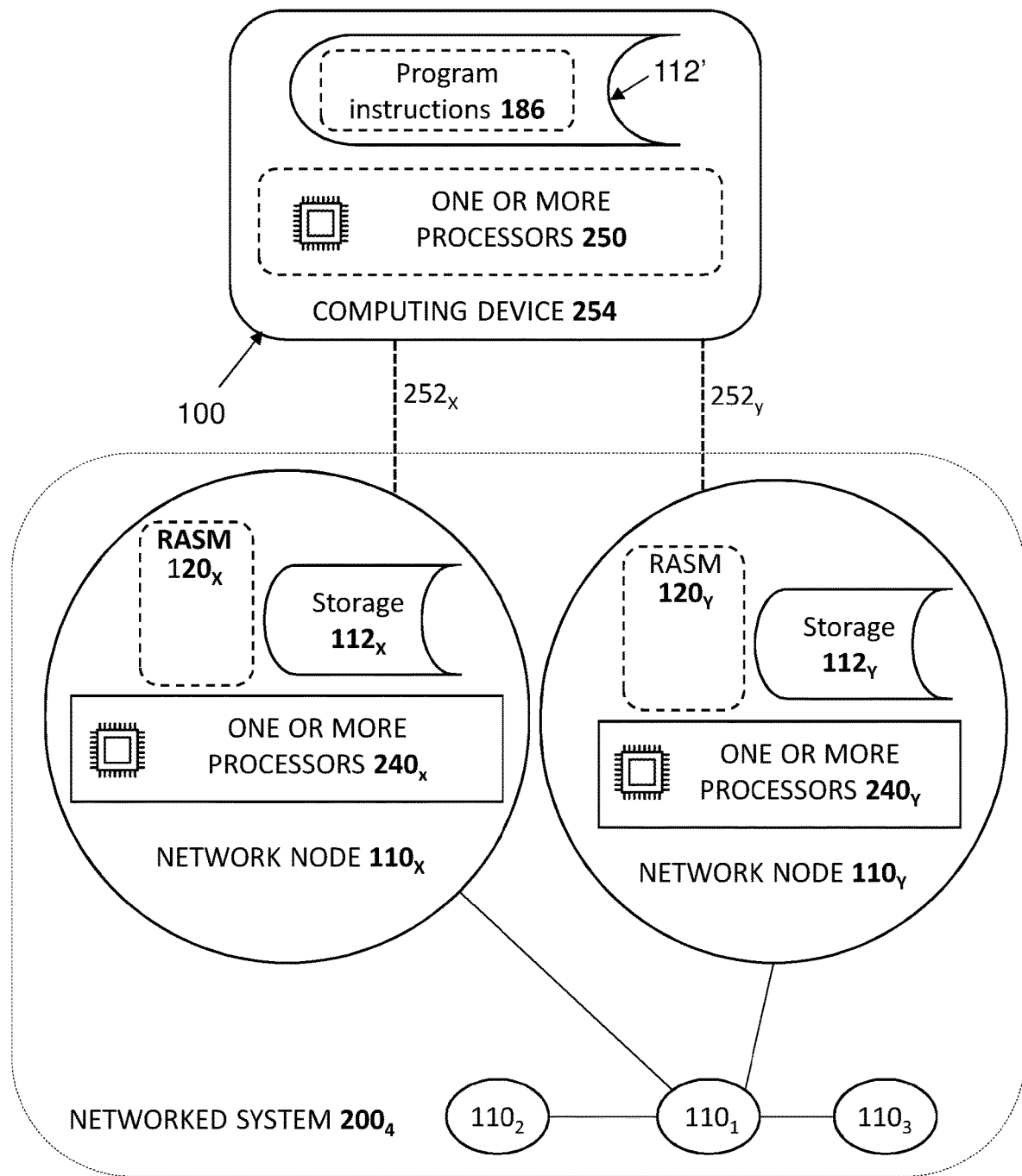

The more detailed diagram of networked system $200_4$ shown in FIG. 15 is similar to the diagram of networked system $200_2$ of FIG. 7, except that reconnaissance agent software modules $120_X$, $120_Y$ are installed in first and second network nodes $110_X$, $110_Y$. As disclosed earlier, the RASM 120 can be installed in any or all of the network nodes 110. The RASMs 120, or at least some program instructions thereof, can be stored in respective storage media 112 of corresponding network nodes 110.

In FIG. 15, reconnaissance-agent non-transitory computer-readable storage medium $112_X$ is associated with a first node $110_X$ and is provided for storage of instructions (not shown) of the reconnaissance agent software module for execution by one or more processors $240_X$ of the first network node $110_X$, which is in electronic communication with a computing device 254 (by communications arrangement $252_X$ which can be an Internet connection or a LAN connection or any other suitable connection, including an indirect connection). Storage medium $112_X$ is shown for convenience as being part of the network node $110_X$ but it can be anywhere as long as the one or more processors $240_X$ can access and execute the instructions stored therein. Similarly, reconnaissance-agent non-transitory computer-readable storage medium $112_Y$ is associated with the second node $110_Y$ and is provided for storage of instructions (not shown) of the reconnaissance agent software module for execution by one or more processors $240_Y$ of the second network node $110_Y$, which is also in electronic communication with the computing device 254 (by communications arrangement $252_Y$ which can be the same as communications arrangement $252_X$ or separate and/or different). Storage medium $112_Y$ is also shown for convenience as being part of the network node $110_Y$ but it can be anywhere as long as the one or more processors $240_Y$ can access and execute the instructions stored therein.

Figure 16:
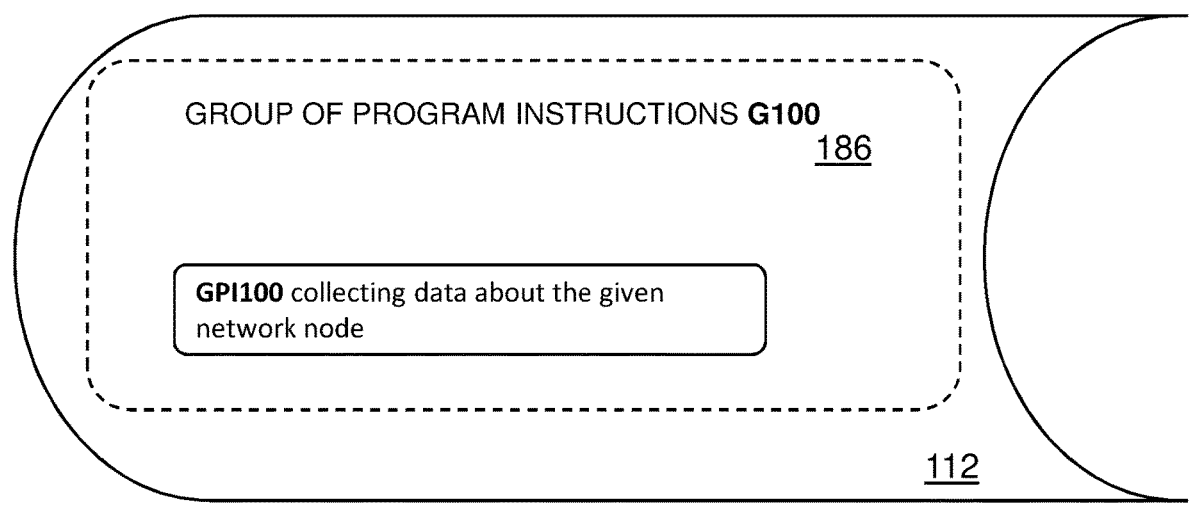
FIG. 16 shows a block diagram of a non-transitory computer-readable storage medium comprising program instructions of a reconnaissance agent software module, for execution by one or more processors at a respective network node, according to embodiments of the present invention.

As illustrated in the block diagram of FIG. 16, when employing a reconnaissance agent in a node, the storage medium 112 includes program instructions 186, which include group of program instructions GPI100. Execution of the program instructions 186 by the one or more processors 240 of a network node 110 causes the one or more processors 240 of the network node 110 to execute the following group of program instructions:

GPI100 for collecting data about the given network node.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons skilled in the art to which the invention pertains.

Definitions

This disclosure should be interpreted according to the definitions below.

In case of a contradiction between the definitions in this Definitions section and other sections of this disclosure, this section should prevail.

In case of a contradiction between the definitions in this section and a definition or a description in any other document, including in another document incorporated in this disclosure by reference, this section should prevail, even if the definition or the description in the other document is commonly accepted by a person of ordinary skill in the art.

1. "computing device"—Any device having a processing unit into which it is possible to install code that can be executed by the processing unit. The installation of the code may be possible even while the device is operative in the field or it may be possible only in the factory.
2. "peripheral device"—Any device, whether a computing device or not, that provides input or output services to at least one other device that is a computing device. Examples of peripheral devices are printers, plotters, scanners, environmental sensors, smart-home controllers, digital cameras, speakers and display screens. A peripheral device may be directly connected to a single computing device or may be connected to a communication system through which it can communicate with one or more computing devices. A storage device that is (i) not included in or directly connected to a single computing device, and (ii) accessible by multiple computing devices, is a peripheral device.
3. "network" or "computing network"—A collection of computing devices and peripheral devices which are all connected to common communication means that allow direct communication between any two of the devices without requiring passing the communicated data through a third device. The network includes both the connected devices and the communication means. A network may be wired or wireless or partially wired and partially wireless.
4. "networked system" or "networked computing system"—One or more networks that are interconnected so that communication is possible between any two devices of the one or more networks, even if they do not belong to the same network. The connection between different networks of the networked system may be achieved through dedicated computing devices, and/or through computing devices that belong to multiple networks of the networked system and also have other functionality in addition to connecting between networks. The networked system includes the one or more networks, any connecting computing devices and also peripheral devices accessible by any computing device of the networked system. Note that a single network is a networked system having only one network, and therefore a network is a special case of a networked system.
5. "module"—A portion of a system that implements a specific task. A module may be composed of hardware, software or any combination of both. For example, in a module composed of both hardware and software, the hardware may include a portion of a computing device, a single computing device or multiple computing devices, and the software may include software code executed by the portion of the computing device, by the single computing device or by the multiple computing devices. A computing device associated with a module may include one or more processors and computer readable storage medium (non-transitory, transitory or a combination of both) for storing instructions or for executing instructions by the one or more processors.
6. "network node of a networked system" or "node of a networked system"—Any computing device or peripheral device that belongs to the networked system.
7. "security vulnerability of a network node" or "vulnerability of a network node"—A weakness which allows an attacker to compromise the network node. A vulnerability of a network node may be caused by one or more of a flawed configuration of a component of the network node, a flawed setting of a software module in the network node, a bug in a software module in the network node, a human error while operating the network node, having trust in an already-compromised other network node, and the like. A weakness that allows an attacker to compromise a network node only conditionally, depending on current conditions in the network node or in the networked system in which the network node resides, is still a vulnerability of the network node, but may also be referred to as a "potential vulnerability of the network node". For example, a vulnerability that compromises any network node running the Windows 7 Operating System, but only if the network node receives messages through a certain Internet port, can be said to be a vulnerability of any Windows 7 network node, and can also be said to be a potential vulnerability of any such node. Note that in this example the potential vulnerability may fail in compromising the node either because the certain port is not open (a condition in the node) or because a firewall is blocking messages from reaching the certain port in the node (a condition of the networked system).

8. "security vulnerability of a networked system" or "vulnerability of a networked system"—A weakness which allows an attacker to compromise the networked system. A vulnerability of a networked system may be caused by one or more of a vulnerability of a network node of the networked system, a flawed configuration of a component of the networked system, a flawed setting of a software module in the networked system, a bug in a software module in the networked system, a human error while operating the networked system, and the like.

A weakness that allows an attacker to compromise a networked system only conditionally, depending on current conditions in the networked system, is still a vulnerability of the networked system, but may also be referred to as a "potential vulnerability of the networked system". For example, if a network node of the networked system has a potential vulnerability then that vulnerability can be said to be a vulnerability of the networked system, and can also be said to be a potential vulnerability of the networked system.

9. "validating a vulnerability" or "validating a potential vulnerability" (for a given network node or for a given networked system)—Verifying that the vulnerability compromises the given network node or the given networked system under the conditions currently existing in the given network node or the given networked system.

The validation of the vulnerability may be achieved by actively attempting to compromise the given network node or the given networked system and then checking if the compromising attempt was successful. Such validation is referred to as "active validation".

Alternatively, the validation of the vulnerability may be achieved by simulating the exploitation of the vulnerability or by otherwise evaluating the results of such exploitation without actively attempting to compromise the given network node or the given networked system. Such validation is referred to as "passive validation". Note that just assuming that a vulnerability will succeed in compromising a given network node or a given networked system under current conditions without executing either active validation or passive validation, is not considered as validating the vulnerability.

10. "vulnerability management"—A cyclical practice of identifying, classifying, remediating, and mitigating vulnerabilities of network nodes in a networked system.

11. "penetration testing" or "pen testing" (in some references also known as "red team assessment" or "red team testing", but in other references those terms referring to a red team have a different meaning than "penetration testing")—A process in which a networked system is evaluated in order to determine if it can be compromised by an attacker by utilizing one or more security vulnerabilities of the networked system. If it is determined that the networked system can be compromised, then the one or more security vulnerabilities of the networked system are identified and reported.

Unlike a vulnerability management process which operates at the level of isolated vulnerabilities of individual network nodes, a penetration test may operate at a higher level which considers vulnerabilities of multiple network nodes that might be jointly used by an attacker to compromise the networked system.

A penetration testing process involves at least the following functions: (i) a reconnaissance function, (ii) an attack function, and (iii) a reporting function. It should be noted that the above functions do not necessarily operate sequentially according to the above order, but may operate in parallel or in an interleaved mode.

Unless otherwise explicitly specified, a reference to penetration testing should be understood as referring to automated penetration testing.

12. "automated penetration testing"—Penetration testing in which at least one of the reconnaissance function, the attack function and the reporting function is at least partially automated.

13. "penetration testing system"—A system capable of performing penetration testing, regardless if composed of hardware, software or combination of both.

14. "reconnaissance function" or "recon function"—The function in a penetration testing process that handles collection of data about the tested networked system. The collected data may include internal data of one or more network nodes of the tested networked system. Additionally, the collected data may include data about communication means of the tested networked system and about peripheral devices of the tested networked system. The collected data may also include data that is only indirectly related to the tested networked system, for example business intelligence data about the organization owning the tested networked system, collected in order to use it for assessing importance of resources of the networked system.

The functionality of a reconnaissance function may be implemented by any combination of (i) software executing in a remote computing device, where the remote computing device may probe the tested networked system for the purpose of collecting data about it, (ii) hardware and/or software simulating or duplicating the tested networked system, (iii) a reconnaissance agent software module executing in one or more network nodes of the tested networked system.

15. "attack function"—The function in a penetration testing process that handles determination of whether one or more security vulnerabilities exist in the tested networked system. The determination is based on data collected by the reconnaissance function of the penetration testing. The attack function generates data about each of the identified security vulnerabilities, if any. The functionality of an attack function may be implemented by any combination of (i) software executing in a remote computing device, where the remote computing device may attack the tested networked system for the purpose of verifying that it can be compromised, (ii) hardware and/or software simulating or duplicating the tested networked system, (iii) an attack agent software module executing in one or more network nodes of the tested networked system.

The methods used by an attack function may include executing a real attack on the tested networked system by attempting to change at least one setting, mode or state of a network node or of a hardware or software component of a network node, in order to verify that the tested networked system may be compromised. In such case, the attempt may result in actually compromising the tested networked system. Alternatively, the methods used by an attack function may be such that whenever there is a need to verify whether a setting, a mode or a state of a network node or of a hardware or software component of a network node can be changed in a way that compromises the tested networked system, the verification is done by simulating the effects of the change or by otherwise evaluating them without ever actually compromising the tested networked system.

16. "reporting function"—The function in a penetration testing process that handles reporting of results of the penetration testing. The reporting comprises at least one of (i) causing a display device to display a report including information about the results of the penetration testing, (ii) recording a report including information about the results of the penetration testing in a file, and (iii) electronically transmitting a report including information about the results of the penetration testing.

The functionality of a reporting function may be implemented by software executing in a remote computing device, for example in the computing device implementing the attack function of the penetration testing.

17. "recovery function" or "clean-up function"—The function in a penetration testing process that handles cleaning-up after a penetration test. The recovery includes undoing any operation done during the penetration testing process that results in compromising the tested networked system.

The functionality of a recovery function may be implemented by any combination of (i) software executing in a remote computing device, for example in the computing device implementing the attack function of the penetration testing, (ii) an attack agent software module executing in one or more network nodes of the tested networked system.

18. "a campaign of penetration testing" or "penetration testing campaign" or just "campaign"—A specific run of a specific test of a specific networked system by the penetration testing system.

An execution of a campaign must end by one of the following: (i) determining by the penetration testing system that the goal of the attacker was reached by the campaign, (ii) determining by the penetration testing system that the goal of the attacker cannot be reached by the campaign, (iii) if the campaign is assigned a time limit, exceeding the time limit by the campaign, and (iv) manually terminating the campaign by a user of the penetration testing system.

19. "results of a penetration testing campaign"—Any output generated by the penetration testing campaign. This includes, among other things, data about any security vulnerability of the networked system tested by the penetration testing campaign that is detected by the campaign. It should be noted that in this context the word "results" is used in its plural form regardless of the amount of output data generated by the penetration testing campaign, including when the output consists of data about a single security vulnerability.

20. "information item of a campaign"—A variable data item that a penetration testing system must know its value before executing the campaign. Note that a data item must be able to have different values at different campaigns in order to be considered an information item of the campaign. If a data item always has the same value for all campaigns, it is not an information item of the campaign, even if it must be known and is being used by the penetration testing system when executing the campaign.

A type of an attacker and a goal of an attacker are examples of information items of a campaign. Another example of an information item of a campaign that is more complex than the previous two simple examples is a subset of the network nodes of the networked system that is assumed to be already compromised at the time of beginning the penetration testing campaign, with the subset defined either by an explicit selection of network nodes or by a Boolean condition each node of the subset has to satisfy.

A value of an information item may be composed either of a simple value or of both a main value and one or more auxiliary values. If a specific main value of an information item requires one or more auxiliary values that complete the full characterization of the value, then the combination of the main value and the one or more auxiliary values together is considered to be the value assigned to the information item. For example, for a "goal of the attacker" information item, after a user selects a main value of "exporting a specific file from whatever node having a copy of it", the user still has to provide a file name as an auxiliary value in order for the goal information item to be fully characterized. In this case the combination of "exporting a specific file from whatever node having a copy of it" and the specific file name is considered to be the value of the "goal of the attacker" information item.

21. "specifications of a campaign" or "scenario"—A collection of values assigned to all information items of the campaign. As having a value for each information item of a campaign is essential for running it, a campaign of a penetration testing system cannot be run without providing the penetration testing system with full specifications of the campaign. A value of an information item included in the specifications of a campaign may be manually selected by a user or may be automatically determined by the penetration testing system. In the latter case, the automatic determination by the system may depend on one or more values selected by the user for one or more information items of the campaign, or it may be independent of any selection by the user. For example, the selection of the capabilities of the attacker may automatically be determined by the system based on the user-selected type of the attacker, and the lateral movement strategy of the attacker may be automatically determined by the system independently of any user selection.

22. "attacker" or "threat actor"—An entity, whether a single person, a group of persons or an organization, that might conduct an attack against a networked system by penetrating it for uncovering its security vulnerabilities and/or for compromising it.

23. "a type of an attacker"—A classification of the attacker that indicates its main incentive in conducting attacks of networked systems. Typical values for a type of an attacker are state-sponsored, opportunistic cyber criminal, organized cyber criminal and insider.

An attacker can have only a single type.

24. "a capability of an attacker"—A tool in the toolbox of the attacker. A capability describes a specific action that the attacker can perform. Examples of capabilities are copying a local file of a network node and exporting it to the attacker out of the networked system and remotely collecting database information from an SQL server of the networked system. In some systems, selecting a type of an attacker causes a corresponding default selection of capabilities for that type of attacker, but the user may have an option to override the default selection and add or delete capabilities.

An attacker can have one or multiple capabilities.

25. "a goal of an attacker"—What the attacker of a campaign is trying to achieve when attacking a targeted networked system. In other words, what is the criterion according to which the attacker will judge whether the attack was a success or a failure and/or to what extent was it a success or a failure.

Selecting a type of an attacker may cause a default selection of a goal for that attacker, but the user may have an option to override the default selection. An attacker can have one or multiple goals.

26. "a lateral movement strategy of an attacker"—A decision logic applied by the attacker of a campaign for selecting the next network node to try to compromise.

In prior art penetration testing systems, during a penetration testing campaign, the attacker is assumed to make progress by an iterative process in which in each iteration he selects the next node to attack, based on the group of network nodes he already controls (i.e. that are already compromised). If the attack on the selected node is successful, that node is added to the group of nodes that are already compromised, and another iteration starts. If the attempt to compromise the selected node fails, another node is selected, either according to some other rule or randomly.

It should be noted that all types of penetration testing systems, whether using simulated penetration testing, actual attack penetration testing or some other form of penetration testing, must use a lateral movement strategy. In the case of a penetration testing system that actually attacks the tested networked system, the lateral movement strategy selects the path of attack actually taken through the networked system. In the case of a penetration testing system that simulates or evaluates the results of attacking the tested networked system, the lateral movement strategy selects the path of attack taken in the simulation or the evaluation through the networked system. Therefore, the term "attack" should be understood to mean "actual attack or simulated attack", the term "already controls" should be understood to mean "already controls or already determined to be able to control", the term "already compromised" should be understood to mean "already compromised or already determined to be compromisable", etc.

A simple example of a prior art lateral movement strategy is a "depth first" strategy. In such strategy, the next network node to try to compromise is (i) either an immediate neighbor of or reachable from the last network node that was compromised, and (ii) is not yet compromised (provided such neighbor node exists).

Another simple example of a prior art lateral movement strategy is a "breadth search" strategy. In such strategy, the next network node to try to compromise is a network node whose distance from the first node compromised by the campaign is the smallest possible. The distance between two network nodes is the number of network nodes along the shortest path between them, plus one. A path is an ordered list of network nodes in which each pair of adjacent nodes in the list is a pair of immediate neighbors. Thus, the distance between two immediate neighbors is one.

An example of a more advanced prior art lateral movement strategy is a strategy that is applicable when a goal of the attacker is related to a resource of the networked system that resides in a specific network node. In such case the next network node to try to compromise may be selected by determining the shortest path in the networked system leading from an already compromised node to the specific node containing the desired resource and picking the first node on this path to be the next node to try to compromise. Note that if the shortest path has a length of one (which happens when the specific node is an immediate neighbor of an already compromised node), then the next node to try to compromise is the specific node containing the desired resource.

Another example of a prior art lateral movement strategy is a strategy that gives priority to network nodes satisfying a specific condition, for example nodes that are known to have a specific weakness, such as running the Windows XP operating system. In such case the next node to try to compromise is a node that satisfies the condition and is also either an immediate neighbor of or reachable from an already compromised node (if such node exists).

However, the term "lateral movement strategy" has a somewhat different meaning when used herein with respect to the present invention than it has in prior art penetration testing systems. In prior art systems, the strategy decides the selection of the next target node from candidate nodes that are all reachable from nodes that are already known to be compromisable. This implies that the target node is selected and validated for potential vulnerabilities after it was determined to be reachable from an already compromisable node. In contrast, in the present invention, the target node is first selected and validated for potential vulnerabilities, and only after that it is checked for being reachable from an already-compromisable node. Thus, the strategy according to embodiments of the present invention decides both (i) the order in which nodes in the group of potential target nodes are selected to be the next target node, and (ii) the order in which already-compromised nodes are checked for being able to communicate with an already selected target node. According to embodiments of the present invention, the strategy causes progress to be made during a penetration testing campaign by answering the question "can an attacker reach, from some already-compromised node, a node already known to be vulnerable?" rather than the question "can an attacker compromise a node (that we don't yet know to be vulnerable) that is reachable from some already-compromised node?"

27. "network nodes A and B are immediate neighbors of each other"—Network nodes A and B have a direct communication link between them that does not pass through any other network node.

28. "network node A can communicate with network node B" or "network node B is reachable from network node A"—Network node A can send information (e.g. commands and/or data) to network node B. The sent information may be passed directly between the two network nodes without passing through any other network node, or it may be passed through one or more other nodes. The communication channel between the two network nodes may be a two-way communication channel, with which each of the two network nodes can send information to the other one. Alternatively, the communication channel may be a one-way communication channel, enabling network node A to send information to network node B, but not the other way around.

29. "penetration testing by simulation" or "simulated penetration testing"—Penetration testing in which the methods used by the attack function are such that whenever there is a need to verify whether a setting, a mode or a state of a network node or of a hardware or software component of a network node can be changed in a way that compromises the tested networked system, the verification is done by simulating the effects of the change or by otherwise evaluating them without risking compromising the tested networked system.

30. "penetration testing by actual attack" or "actual attack penetration testing" or "penetration testing by actual exploit" or "actual exploit penetration testing"—Penetration testing in which the methods used by the attack function include executing a real attack on the tested networked system by attempting to change at least one setting, mode or state of a network node or of a hardware or software component of a network node in order to verify that the tested networked system may be compromised, such that the attempt may result in compromising the tested networked system.

31. "penetration testing by reconnaissance agents" or "reconnaissance agent penetration testing"—Penetration testing in which the functionality of the reconnaissance function is at least partially implemented by a reconnaissance agent software module installed and executed in each one of multiple network nodes of the tested networked system.

32. "reconnaissance client agent", "reconnaissance agent" or "recon agent"—A software module that can be installed on a network node and can be executed by a processor of that network node for partially or fully implementing the reconnaissance function of a penetration test. A reconnaissance agent must be capable, when executed by a processor of the network node in which it is installed, of collecting data at least about some of the events occurring in the network node. Such events may be internal events of the network node or messages sent out of the network node or received by the network node. A reconnaissance agent may be capable of collecting data about all types of internal events of its hosting network node. Additionally, it may be capable of collecting other types of data of its hosting network node. A reconnaissance agent may additionally be capable of collecting data about other network nodes or about other components of a networked system containing the hosting network node. A reconnaissance agent may be persistently installed on a network node, where "persistently" means that once installed on a network node the reconnaissance agent survives a reboot of the network node. Alternatively, a reconnaissance agent may be non-persistently installed on a network node, where "non-persistently" means that the reconnaissance agent does not survive a reboot of the network node and consequently should be installed again on the network node for a new penetration test in which the network node takes part, if the network node was rebooted since the previous penetration test in which it took part.

33. "attack client agent" or "attack agent"—A software module that can be installed on a network node and can be executed by a processor of that network node for partially or fully implementing the attack function of a penetration test. Typically, an attack agent is installed by an actual attack penetration testing system in a network node that it had succeeded to compromise during a penetration test. Once installed on such network node, the attack agent may be used as a tool for compromising other network nodes in the same networked system. In such case, the attack agent may include code that when executed by a processor of the compromised network node compromises another network node that is adjacent to it in the networked system, possibly taking advantage of the high level of trust it may have from the point of view of the adjacent network node. Another type of an attack agent may include code that when executed by a processor of a network node determines whether that network node would be compromised if a given operation is performed.

34. "penetration testing software module" or "remote computing device penetration testing software module"—A software module that implements the full functionality of a penetration testing system, except for the functionality implemented by (i) reconnaissance agents, (ii) attack agents, and (iii) hardware and/or software simulating or duplicating the tested networked system, if such components are used in the implementation of the penetration testing system. The penetration testing software module may be installed and executed on a single computing device or comprise multiple software components that reside on multiple computing devices. For example, a first component of the penetration testing software module may implement part or all of the reconnaissance function and be installed and executed on a first computing device, a second component of the penetration testing software module may implement part or all of the attack function and be installed and executed on a second computing device, and a third component of the penetration testing software module may implement the reporting function and be installed and executed on a third computing device.

35. "internal data of a network node"—Data related to the network node that is only directly accessible to code executing by a processor of the network node and is only accessible to any code executing outside of the network node by receiving it from code executing by a processor of the network node. Examples of internal data of a network node are data about internal events of the network node, data about internal conditions of the network node, and internal factual data of the network node.

36. "internal event of/in a network node"—An event occurring in the network node whose occurrence is only directly detectable by code executing by a processor of the network node. Examples of an internal event of a network node are an insertion of a USB drive into a port of the network node, and a removal of a USB drive from a port of the network node. An internal event may be a free event or a non-free event.

It should be noted that the term "an event of X" refers to any occurrence of an event of the type X and not to a specific occurrence of it. For referring to a specific occurrence of an event of type X one should explicitly say "an occurrence of event of X". Thus, a software module which looks for detecting insertions of a USB drive into a port is "detecting an event of USB drive insertion", while after that module had detected such event it may report "an occurrence of an event of USB drive insertion".

37. "internal condition of/in a network node"—A Boolean condition related to the network node which can only be directly tested by code executing by a processor of the network node. Examples of an internal condition of a network node are whether the local disk of the terminal node is more than 98% full or not, and whether a USB drive is currently inserted in a port of the network node.

38. "internal factual data of/in a network node" or "internal facts of a network node"—Facts related to the network node which can only be directly found by code executing by a processor of the network node. Examples of factual data of a network node are the version of the firmware of a solid-state drive installed in the network node, the hardware version of a processor of the network node, and the amount of free space in a local disk of the network node.

39. "resource of a network node"—A file in the network node, a folder in the network node, credentials of a user residing in the network node (the credentials not necessarily applying to the network node containing the credentials), a peripheral device of the network node or a communication device accessible to the network node.

40. "resource of a networked system"—A file in a network node of the networked system, a folder in a network node of the networked system, credentials of a user of the networked system, a peripheral device of a network node of the networked system, a peripheral device directly attached to a network of the networked system, or a communication device accessible by a network node of the networked system.

41. "access rights" (of a user in a network node)—Rights of the user to perform operations on resources of the network node. For example, a right to execute a given file or a given class of files, a right to read from a given file or from a given folder, a right to create a new file in a given folder, a right to change a given file, a right to print on a given printer, or a right to send out data through a given communication device.

42. "compromising a network node"—Successfully causing execution of an operation in the network node that is not allowed for the entity requesting the operation by the rules defined by an administrator of the network node, or successfully causing execution of code in a software module of the network node that was not predicted by the vendor of the software module. Examples for compromising a network node are reading a file without having read permission for it, modifying a file without having write permission for it, deleting a file without having delete permission for it, exporting a file out of the network node without having permission to do so, getting an access right higher than the one originally assigned without having permission to get it, getting a priority higher than the one originally assigned without having permission to get it, changing a configuration of a firewall network node such that it allows access to other network nodes that were previously hidden behind the firewall without having permission to do it, and causing execution of software code by utilizing a buffer overflow. As shown by the firewall example, the effects of compromising a certain network node are not necessarily limited to that certain network node. In addition, executing successful ARP spoofing, denial-of-service, man-in-the-middle or session-hijacking attacks against a network node are also considered compromising that network node, even if not satisfying any of the conditions listed above in this definition.

43. "ARP spoofing"—a technique for compromising a target network node in which an attacker sends a false Address Resolution Protocol (ARP) reply message to the target network node. The aim is to associate an attacker's MAC address (either a MAC address of the node sending the false ARP reply message or a MAC address of another node controlled by the attacker) with the IP address of another host, such as the default gateway, causing any traffic sent by the target node and meant for that IP address to be sent to the attacker instead. ARP spoofing may allow an attacker to intercept data frames on a network, modify the traffic, or stop all traffic to a certain node. Often the attack is used as an opening for other attacks, such as denial-of-service, man-in-the-middle, or session-hijacking attacks.

44. "denial-of-service attack"—a cyber-attack where an attacker seeks to make a service provided by a network node to other network nodes unavailable to its intended users either temporarily or indefinitely. The denial-of-service attack may be accomplished by flooding the node providing the targeted service with superfluous requests in an attempt to overload it and prevent some or all legitimate requests from being fulfilled. Alternatively, the denial-of-service attack may be accomplished by causing some or all of the legitimate requests addressed to the targeted service to not reach their destination.

45. "man-in-the-middle attack"—a cyber-attack where an attacker secretly relays and possibly alters the communication between two network nodes who believe they are directly communicating with each other. One example of man-in-the-middle attacks is active eavesdropping, in which the attacker makes independent connections with the victims and relays messages between them to make them believe they are communicating directly with each other, when in fact the entire communication session is controlled by the attacker. The attacker must be able to intercept all relevant messages passing between the two victims and inject new ones.

46. "session-hijacking attack"—a cyber-attack where a valid communication session between two network nodes in a networked system is used by an attacker to gain unauthorized access to information or services in the networked computer system.

47. "compromising a networked system"—Compromising at least one network node of the networked system or successfully causing execution of an operation in the networked system that is not allowed for the entity requesting the operation by the rules defined by an administrator of the networked system. Examples for operations in the networked system that may not be allowed are exporting a file out of the networked system without having permission to do so, sending a file to a network printer without having permission to do so, and copying a file from one network node to another network node without having permission to do so.
48. "compromising a software application"—Successfully causing the software application to execute an operation that is not allowed for the entity requesting the operation by the rules defined by an administrator of the network node on which the software application is installed or by a vendor of the software application, or successfully causing the execution of code in the software application that was not predicted by the vendor of the software application. Examples for compromising a software application are changing a configuration file controlling the operation of the software application without having permission for doing so, and activating a privileged function of the software application without having permission for doing so. In addition, causing the software application to execute a macro without checking rights of the macro code to do what it is attempting to do is also considered compromising that software application, even if not satisfying any of the conditions listed above in this definition.
49. "administrator of a network node"—Any person that is authorized, among other things, to define or change at least one rule controlling at least one of an access right, a permission, a priority and a configuration in the network node.
50. "administrator of a networked system"—Any person that is authorized, among other things, to define or change at least one rule controlling at least one of an access right, a permission, a priority and a configuration in the networked system. Note that an administrator of a networked system may also be an administrator of one or more of the network nodes of the networked system.
51. "remote computing device" or "penetration testing remote computing device" (with respect to a given networked system)—A computing device that executes software implementing part or all of the penetration testing software module that is used for testing the given networked system.
   A remote computing device may be (i) outside of the given networked system, or (ii) inside the given networked system. In other words, a remote computing device is not necessarily physically remote from the given networked system. It is called "remote" to indicate its functionality is logically separate from the functionality of the given networked system.
   A remote computing device may (i) be a dedicated computing device that is dedicated only to doing penetration testing, or (ii) also implement other functionality not directly related to penetration testing.
   A remote computing device is not limited to be a single physical device with a single processing unit. It may be implemented by multiple separate physical devices packaged in separate packages that may be located at different locations. Each of the separate physical devices may include one or multiple processing units.
   A remote computing device may be (i) a physical computing device, or (ii) a virtual machine running inside a physical computing device on top of a hosting operating system.
52. "termination condition of a campaign", "terminating condition of a campaign", "halting condition of a campaign", "stopping condition of a campaign", "termination criterion of a campaign", "terminating criterion of a campaign", "halting criterion of a campaign", or "stopping criterion of a campaign"—A Boolean condition defined for the campaign that if and when satisfied causes the halting of the campaign, even if the goal of the attacker of the campaign was not yet reached.
   For the sake of the above defined terms the singular and plural forms are equivalent—"criterion" and "criteria" are used interchangeably, and so are "condition" and "conditions".
   The condition may be a simple condition (for example "the number of already compromised nodes in the tested networked system is five or more") or a compound condition composed of multiple simple conditions and one or more logical operators (for example "a file named company_budget.xls is exported out of the tested networked system from any network node, or at least ten files were encrypted by the attacker in the network node used by the organization's CFO").
   A halting condition of a campaign can be defined for all types of penetration testing systems. For an actual attack penetration testing system, the halting condition is typically associated with the state or status of the tested networked system. For penetration testing systems that do not attempt to compromise the tested networked system, the halting condition is typically associated with a state or status of a simulation of the networked system or may be evaluated based on such state or status. However, the above is not limiting in any way, and the halting condition may depend on any factor that is available to the penetration testing system during the campaign, including on factors that are independent of the state and the status of the campaign, for example on the amount of time spent on running the campaign or on the time of day.
53. "explicitly selecting"—Directly and clearly selecting, by a human user, of one option out of multiple options available to the human user, leaving no room for doubt and not relying on making deductions by a computing device.
   Examples of explicit selections are (i) selection of a specific type of an attacker from a drop-down list of types, (ii) selection of specific one or more attacker capabilities by marking one or more check boxes in a group of multiple check boxes corresponding to multiple attacker capabilities, and (iii) reception for viewing by a user of a recommendation automatically computed by a computing device for a value of an information item and actively approving by the user of the recommendation for using the value, provided that the approving user has an option of rejecting the recommendation and selecting a different value for the information item.
   Examples of selections that are not explicit selections are (i) selection of specific one or more attacker capabilities by selecting a specific scenario of a penetration testing system from a pre-defined library of scenarios, where the specific scenario includes an attacker having the one or more capabilities, and (ii) selection of specific one or more attacker capabilities by selecting a specific goal of an attacker, accompanied by a deduction by a computing device concluding that the specific one or more attacker capabilities must be selected because they are essential for the attacker to succeed in meeting the specific goal.

54. "automatically selecting"—Selecting, by a computing device, of one option out of multiple options, without receiving from a human user an explicit selection of the selected option. It should be noted that the selecting of an option is an automatic selecting even if the computing device is basing the selection on one or more explicit selections by the user, as long as the selected option itself is not explicitly selected by the user. It should also be noted that receiving from a user of an approval for a recommendation which is otherwise automatically selected without giving the user an ability to override the recommendation does not make the selection a non-automatic selection. An example of an automatic selection is a selection by a computing device of one or more attacker capabilities by (a) receiving from a user an explicit selection of a specific scenario of a penetration testing system from a predefined library of scenarios, (b) determining by the computing device that the specific scenario includes an attacker having the one or more capabilities, and (c) deducing by the computing device that the user wants to select the one or more attacker capabilities.

An example of a selection that is not an automatic selection is a selection of a value for an information item by (a) calculating by a computing device of a recommended value for the information item, (b) displaying the recommendation to a user, and (c) receiving from the user an explicit approval to use the recommended value of the information item, provided that the approving user has an option of rejecting the recommendation and selecting a different value for the information item.

55. "defensive application"—A software application whose task is to defend the network node in which it is installed against potential attackers. A defensive application may be a passive defensive application, in which case it only detects and reports penetration attempts into its hosting network node but does not attempt to defend against the detected attacks. Alternatively, a defensive application may be an active defensive application, in which case it not only detects penetration attempts into its hosting network node but also attempts to defend its hosting node against the detected attacks by activating at least one counter-measure.

56. "user interface"—A man-machine interface that does at least one of (i) providing information to a user, and (ii) receiving input from the user. Towards this end, any user interface includes at least one of (i) an input device (e.g. touch-screen, mouse, keyboard, joystick, camera) for receiving input from the user, and (ii) an output device (e.g. display screen such as a touch-screen, speaker) for providing information to the user. A user interface typically also includes executable user-interface code for at least one of (i) causing the output device to provide information to the user (e.g. to display text associated with radio-buttons or with a check list, or text of a drop-down list) and (ii) processing user-input received via the input device.

In different examples, the executable code may be compiled-code (e.g. in assembly or machine-language), interpreted byte-code (e.g. Java byte-code), or browser-executed code (e.g. JavaScript code) that may be sent to a client device from a remote server and then executed by the client device.

57. "user interface of a computing device"—A user interface that is functionally attached to the computing device and serves the computing device for interacting with the user.

An input device of a user interface of a computing device may share a common housing with the computing device (e.g. a touch-screen of a tablet), or may be physically separate from the computing device and be in communication with it, either through a physical port (e.g. a USB port) or wirelessly (e.g. a wireless mouse).

An output device of a user interface of a computing device may share a common housing with the computing device (e.g. a touch-screen of a tablet), or may be physically separate from the computing device and be in communication with it, either through a physical port (e.g. an HDMI port) or wirelessly.

User-interface code of a user interface of a computing device is stored in a memory accessible to the computing device and is executed by one or more processors of the computing device. In one example related to web-based user interfaces, at least some of this code may be received from a remote server and then locally executed by the computing device which functions as a client. In another example related to locally-implemented user interfaces, all of the user-interface code is pre-loaded onto the computing device.

58. "random selection"—A selection that depends on a random or pseudo-random factor. Different possible outcomes in a random selection do not necessarily have the same probabilities of being selected.

59. "a Boolean condition"—A statement that can have a value of either true or false. If the statement is true, we say that the Boolean condition is satisfied. If the statement is false, we say that the Boolean condition is not satisfied.

60. "network node A can communicate with network node B to the extent required for exploiting a given vulnerability of network node B"—Network node A has a way of communicating or sending information to network node B so that it can exploit the given vulnerability of network node B for compromising network node B.

The communication employed by network node A can be direct communication or indirect communication. When the communication is direct, network node A can send one or more messages explicitly addressed to network node B, where the receiving of those one or more messages in network node B causes network node B to become compromised. For example, network node A can send a poisoned email message to network node B, where the receiving of the poisoned mail at network node B is known to cause network node B to become compromised (e.g. because the user of network node B is known to have the vulnerability of opening every email he receives).

When the communication is indirect, network node A can achieve the compromising of network node B without sending a message explicitly addressed to network node B. For example, if network node B is known to have a vulnerability of frequently retrieving and executing a given executable file from a given shared folder, and network node A has write access to the given shared folder, then network node A can indirectly communicate with network node B by replacing the given executable file with a poisoned file, that when retrieved and executed by network node B will cause it to become compromised.

The required communication can be one-way communication or two-way communication. When the required communication is one-way, there is no need for node B to be able to send information to node A. For example, the above example about sending a poisoned email from node A to node B requires only one-way communication. On the other hand, when the required communication is two-way, there is a need for node B to be able to send information to node A in order become compromised. For example, in order for network node A to be able to apply ARP Spoofing to network node B (by sending a fake ARP Response message), it is essential that network node B first sends out an ARP Request message that is received by network node A.

61. "subset/subgroup of a given set/group" or "sub-set/sub-group of a given set/group"—A set/group that satisfies the condition that that every member of it is also a member of the given set/group. Unless otherwise stated, a subset/subgroup may be empty and contain no members at all. Unless otherwise stated, a subset/subgroup of a given set/group may contain all the members of the given set/group and be equal to the given set/group.

62. "proper subset/subgroup of a given set/group" or "proper sub-set/sub-group of a given set/group"—A subset/subgroup of the given set/group that is not equal to the given set/group. In other words, there is at least one member of the given set/group that is not a member of the subset/subgroup.

63. "or"—A logical operator combining two Boolean input conditions into a Boolean compound condition, such that the compound condition is satisfied if and only if at least one of the two input conditions is satisfied. In other words, if condition C=condition A or condition B, then condition C is not satisfied when both condition A and condition B are not satisfied, but is satisfied in each of the following cases: (i) condition A is satisfied and condition B is not satisfied, (ii) condition A is not satisfied and condition B is satisfied, and (iii) both condition A and condition B are satisfied.

64. "one of A and B"—If A and B are specific items, then "one of A and B" is equivalent to "only A or only B, but not both". For example, "one of John and Mary" is equivalent to "only John or only Mary, but not both John and Mary". If A and B are categories, then "one of A and B" is equivalent to "only one of A or only one of B, but not both one of A and one of B". For example, "one of a dog and a cat" is equivalent to "only one dog or only one cat, but not both one dog and one cat". Similarly, if A and B are specific items, then "at least one of A and B" is equivalent to "only A or only B, or both A and B". For example, "at least one of John and Mary" is equivalent to "only John or only Mary, or both John and Mary". If A and B are categories, then "at least one of A and B" is equivalent to "only at least one of A or only at least one of B, or both at least one of A and at least one of B". For example, "at least one of a dog and a cat" is equivalent to "only at least one dog or only at least one cat, or both at least one dog and at least one cat".

Note that in "one of dogs and cats", "dogs" and "cats" are not categories but specific groups (i.e. specific items). Therefore, "one of dogs and cats" is equivalent to "only dogs or only cats, but not both dogs and cats" Similarly, "at least one of dogs and cats" is equivalent to "only dogs or only cats, or both dogs and cats".

If A, B and C are specific items, then "one of A, B and C" is equivalent to "only A or only B or only C, but not a combination of two or three members of the group consisting of: A, B and C", and "at least one of A, B and C" is equivalent to "only A or only B or only C, or any combination of two or three members of the group consisting of: A, B and C".

If A, B and C are categories, then "one of A, B and C" is equivalent to "only one of A or only one of B or only one of C, but not a combination of two or three members of the group consisting of: one of A, one of B and one of C", and "at least one of A, B and C" is equivalent to "only at least one of A or only at least one of B or only at least one of C, or any combination of two or three members of the group consisting of: one of A, one of B and one of C". If the list following the "one of" or the "at least one of" contains more than three members, then the previous definitions are again applicable, with the appropriate modifications that extrapolate the above logic.

Note that "one or more of" is equivalent to "at least one of", and the two terms are synonyms.

The invention claimed is:

1. A method for executing a penetration testing campaign in a networked system by a penetration testing system so as to determine a way for an attacker to compromise the networked system, the networked system comprising a plurality of network nodes, the method comprising:
   a. performing a determination of conditional compromisability for a network-node-set comprising one or more network nodes of the plurality of network nodes, the performing of the determination of conditional compromisability for the network-node-set including:
      i. for each given network node of the network-node-set, performing a determination of conditional compromisability for the given network node by examining the given network node so as to determine whether the given network node can be compromised by the attacker (A) using a corresponding vulnerability applicable to the given network node, and (B) from a network node of the plurality of network nodes that (1) is already determined to be compromisable by the attacker prior to the performing of the determination of conditional compromisability for the network-node-set and (2) can communicate with the given network node to the extent required for exploiting the corresponding vulnerability in the given network node, and
      ii. identifying a group of potential target nodes consisting of every network node of the network-node-set that is determined to be conditionally compromisable;
   b. subsequent to the performing of the determination of conditional compromisability for the network-node-set, selecting a target network node from the group of potential target nodes;
   c. selecting a potential attacking network node from the plurality of network nodes of the networked system which are already determined to be compromisable by the attacker prior to the performing of the determination of conditional compromisability for the network-node-set;

d. checking whether the selected potential attacking network node can communicate with the selected target network node to the extent required for exploiting the vulnerability corresponding to the selected target network node;

e. in response to determining that the selected potential attacking network node can communicate with the selected target network node to the extent required, determining that the selected target network node is compromisable by the attacker;

f. determining the way for the attacker to compromise the networked system, wherein the way for the attacker to compromise the networked system includes a step of compromising the selected target network node using the vulnerability corresponding to the selected target network node; and g. reporting the determined way for the attacker to compromise the networked system, the reporting comprising at least one operation selected from the group consisting of (i) causing a display device to display a report including information about the determined way to compromise the networked system, (ii) recording the report including the information about the determined way to compromise the networked system in a file, and (iii) electronically transmitting the report including the information about the determined way to compromise the networked system.

2. The method of claim 1, wherein (i) the vulnerability corresponding to the selected target network node requires two-way communication between the selected target network node and any network node that exploits the vulnerability in the selected target network node, and (ii) the selected potential attacking network node can communicate with the selected target network node in both directions.

3. The method of claim 1, wherein (i) the vulnerability corresponding to the selected target network node requires communication to the selected target network node from any network node that exploits the vulnerability in the selected target network node, and (ii) the selected potential attacking network node can communicate with the selected target network node at least in the forward direction.

4. The method of claim 1, wherein the network-node-set is a proper subset of the group of all network nodes of the networked system that are not already determined to be compromisable by the attacker prior to the performing of the determination of conditional compromisability for the network-node-set.

5. The method of claim 4, wherein the network-node-set includes only network nodes that contain corresponding valuable resources.

6. The method of claim 1, wherein, for a group of network nodes that is a non-empty subset of the network-node-set, the performing of the determination of conditional compromisability for each given network node in the group of network nodes comprises:

i. obtaining data about the given network node;

ii. identifying, based on the obtained data about the given network node, a group of one or more potential vulnerabilities that may be applicable to the given network node; and iii. validating, based on the obtained data about the given network node, that there is at least one vulnerability in the group of one or more potential vulnerabilities which could be exploited for successfully compromising the given network node by any already-compromised node that can communicate with the given network node to the extent required for exploiting the at least one vulnerability.

7. The method of claim 6, wherein all of the obtained data about the given network node used by the validating is obtained prior to the identifying of the group of one or more potential vulnerabilities that may be applicable to the given network node.

8. The method of claim 6, wherein at least some of the obtained data about the given network node used by the validating is obtained subsequent to the identifying of the group of one or more potential vulnerabilities that may be applicable to the given network node.

9. The method of claim 6, wherein (i) the penetration testing system comprises (A) a penetration testing software module installed on a remote computing device and (B) a reconnaissance agent software module installed on at least some network nodes of the plurality of network nodes, and (ii) the obtained data about the given network node is collected by the reconnaissance agent software module installed on the given network node.

10. The method of claim 1, wherein the performing of the determination of conditional compromisability for the network-node-set includes performing a determination of conditional compromisability for a first network node and performing a determination of conditional compromisability for a second network node, wherein the performing of the determination of conditional compromisability for the first network node ends before the performing of the determination of conditional compromisability for the second network node starts.

11. The method of claim 1, wherein the performing of the determination of conditional compromisability for the network-node-set includes performing a determination of conditional compromisability for a first network node and performing a determination of conditional compromisability for a second network node, wherein the performing of the determination of conditional compromisability for the first network node starts before and ends after the performing of the determination of conditional compromisability for the second network node starts.

12. The method of claim 1, further comprising:

h. subsequent to the performing of the determination of conditional compromisability for the network-node-set, performing a second determination of conditional compromisability for a second network-node-set comprising one or more network nodes of the plurality of network nodes, thereby identifying a second group of potential target nodes consisting of every network node of the second network-node-set that is determined to be conditionally compromisable;

i. subsequent to the performing of the second determination of conditional compromisability for the second network-node-set, selecting a second target network node from the second group of potential target nodes;

j. selecting a second potential attacking network node from the plurality of network nodes of the networked system that are already determined to be compromisable by the attacker prior to the performing of the second determination of conditional compromisability for the second network-node-set;

k. checking whether the selected second potential attacking network node can communicate with the selected second target network node to the extent required for exploiting the vulnerability corresponding to the selected second target network node; and l. in response to determining that the selected second potential attacking network node can communicate with the selected second target network node to the extent required, determining that the selected second target network node is compromisable by the attacker, wherein the way for the attacker to compromise the networked system further includes a step of compromising the selected second target network node using the vulnerability corresponding to the selected second target network node.

13. The method of claim 12, wherein the performing of the second determination of conditional compromisability for the second network-node-set is done subsequent to performing steps b-d for every network node in the group of potential target nodes.

14. The method of claim 12, wherein the performing of the second determination of conditional compromisability for the second network-node-set is done in response to the number of network nodes of the group of potential target nodes for which steps b-d were performed reaching a given threshold.

15. The method of claim 12, wherein the performing of the second determination of conditional compromisability for the second network-node-set is done in response to the time since the start or end of the performing of the determination of conditional compromisability for the network-node-set reaching a given threshold.

16. The method of claim 1, wherein the selecting of the target network node from the group of potential target nodes is based on one or more resources of the selected target network node.

17. The method of claim 1, wherein the selecting of the target network node from the group of potential target nodes is based on a location of the selected target network node in the networked system.

18. The method of claim 1, wherein the selecting of the target network node from the group of potential target nodes is based on data about the selected target network node.

19. The method of claim 1, wherein the selecting of the potential attacking network node from the plurality of network nodes that are already determined to be compromisable by the attacker prior to the performing of the determination of conditional compromisability for the network-node-set comprises selecting a special network node that corresponds to a computing device that is external to the networked system.

20. A penetration testing system for executing a penetration testing campaign in a networked system so as to determine a way for an attacker to compromise the networked system, the networked system comprising a plurality of network nodes, the penetration system comprising:
   a. a remote computing device comprising a computer memory and one or more processors, the remote computing device in electronic communication with at least some network nodes of the plurality of network nodes of the networked system; and
   b. a penetration-testing non-transitory computer-readable storage medium having stored therein program instructions of a penetration testing software module, which when executed by the one or more processors of the remote computing device cause the one or more processors of the remote computing device to carry out the following steps:
      i. performing a determination of conditional compromisability for a network-node-set comprising one or more network nodes of the plurality of network nodes, the performing of the determination of conditional compromisability for the network-node-set including:
         A. for each given network node of the network-node-set, performing a determination of conditional compromisability for the given network node by determining whether the given network node can be compromised by the attacker (1) using a corresponding vulnerability applicable to the given network node, and (2) from a network node of the plurality of network nodes that (a) is already determined to be compromisable by the attacker prior to the performing of the determination of conditional compromisability for the network-node-set and (b) can communicate with the given network node to the extent required for exploiting the corresponding vulnerability in the given network node, and
         B. identifying a group of potential target nodes consisting of every network node of the network-node-set that is determined to be conditionally compromisable;
      ii. subsequent to the performing of the determination of conditional compromisability for the network-node-set, selecting a target network node from the group of potential target nodes;
      iii. selecting a potential attacking network node from the plurality of network nodes of the networked system which are already determined to be compromisable by the attacker prior to the performing of the determination of conditional compromisability for the network-node-set;
      iv. checking whether the selected potential attacking network node can communicate with the selected target network node to the extent required for exploiting the vulnerability corresponding to the selected target network node;
      v. in response to determining that the selected potential attacking network node can communicate with the selected target network node to the extent required, determining that the selected target network node is compromisable by the attacker;
      vi. determining the way for the attacker to compromise the networked system, wherein the way for the attacker to compromise the networked system includes a step of compromising the selected target network node using the vulnerability corresponding to the selected target network node; and
      vii. reporting the determined way for the attacker to compromise the networked system, the reporting comprising at least one operation selected from the group consisting of (A) causing a display device to display a report including information about the determined way to compromise the networked system, (B) recording the report including the information about the determined way to compromise the networked system in a file, and (C) electronically transmitting the report including the information about the determined way to compromise the networked system.

* * * * *